April 24, 1934.　　　N. PEDERSEN　　　1,955,761

WINDING MACHINE

Filed Feb. 4, 1927　　　10 Sheets-Sheet 1

April 24, 1934.  N. PEDERSEN  1,955,761
WINDING MACHINE
Filed Feb. 4, 1927

Inventor
Niels Pedersen
By his Attorney
Victor D. Borst

April 24, 1934.  N. PEDERSEN  1,955,761
WINDING MACHINE
Filed Feb. 4, 1927  10 Sheets-Sheet 5
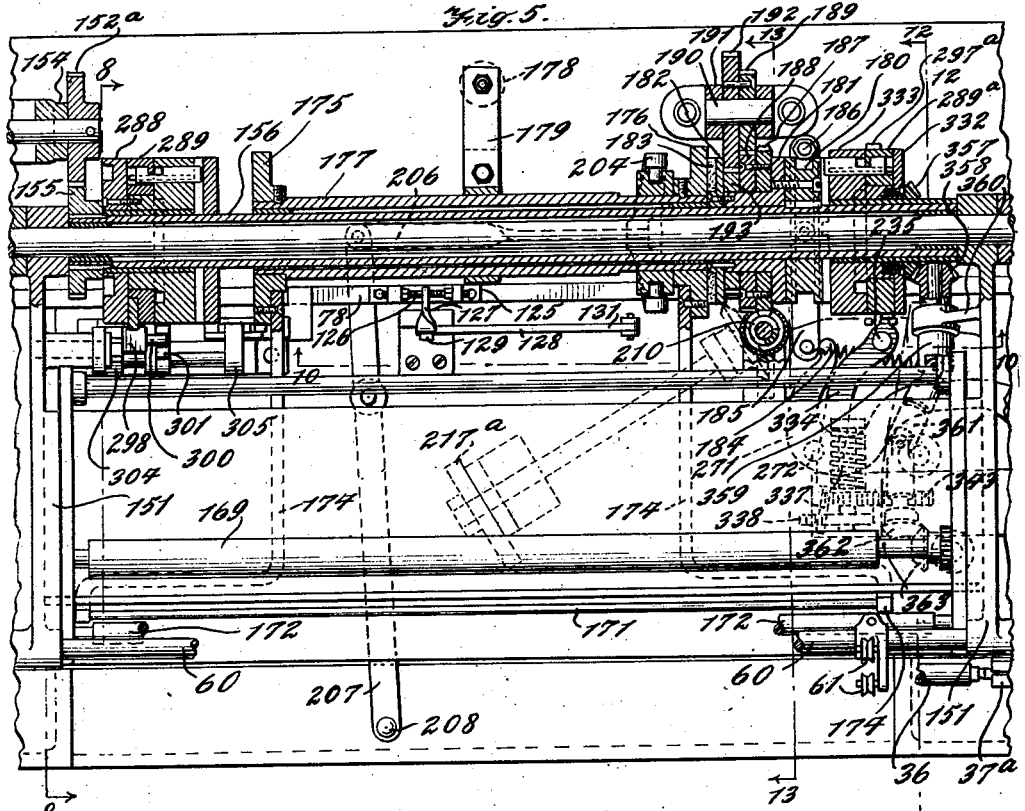
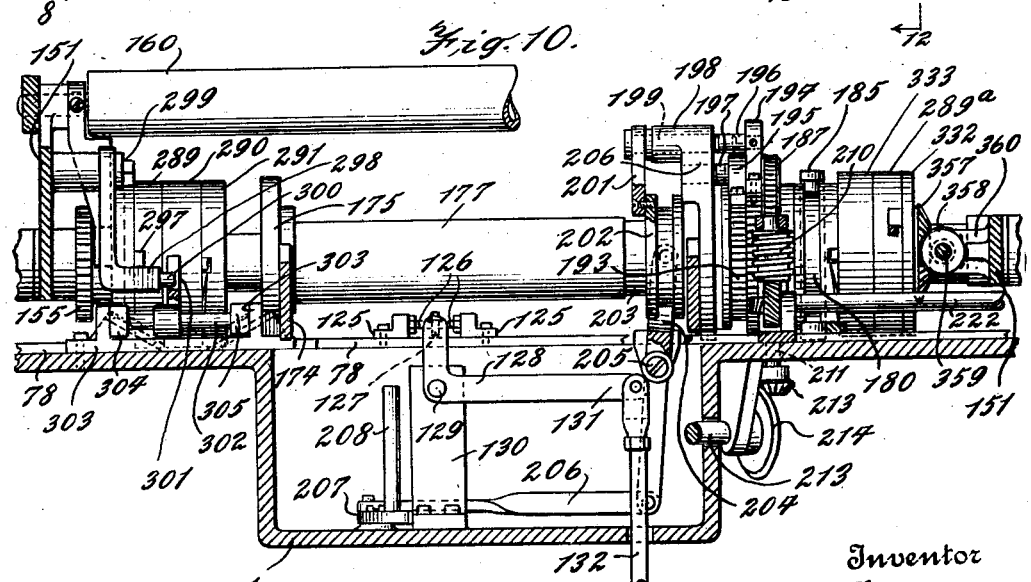

April 24, 1934.  N. PEDERSEN  1,955,761
WINDING MACHINE
Filed Feb. 4, 1927  10 Sheets-Sheet 6
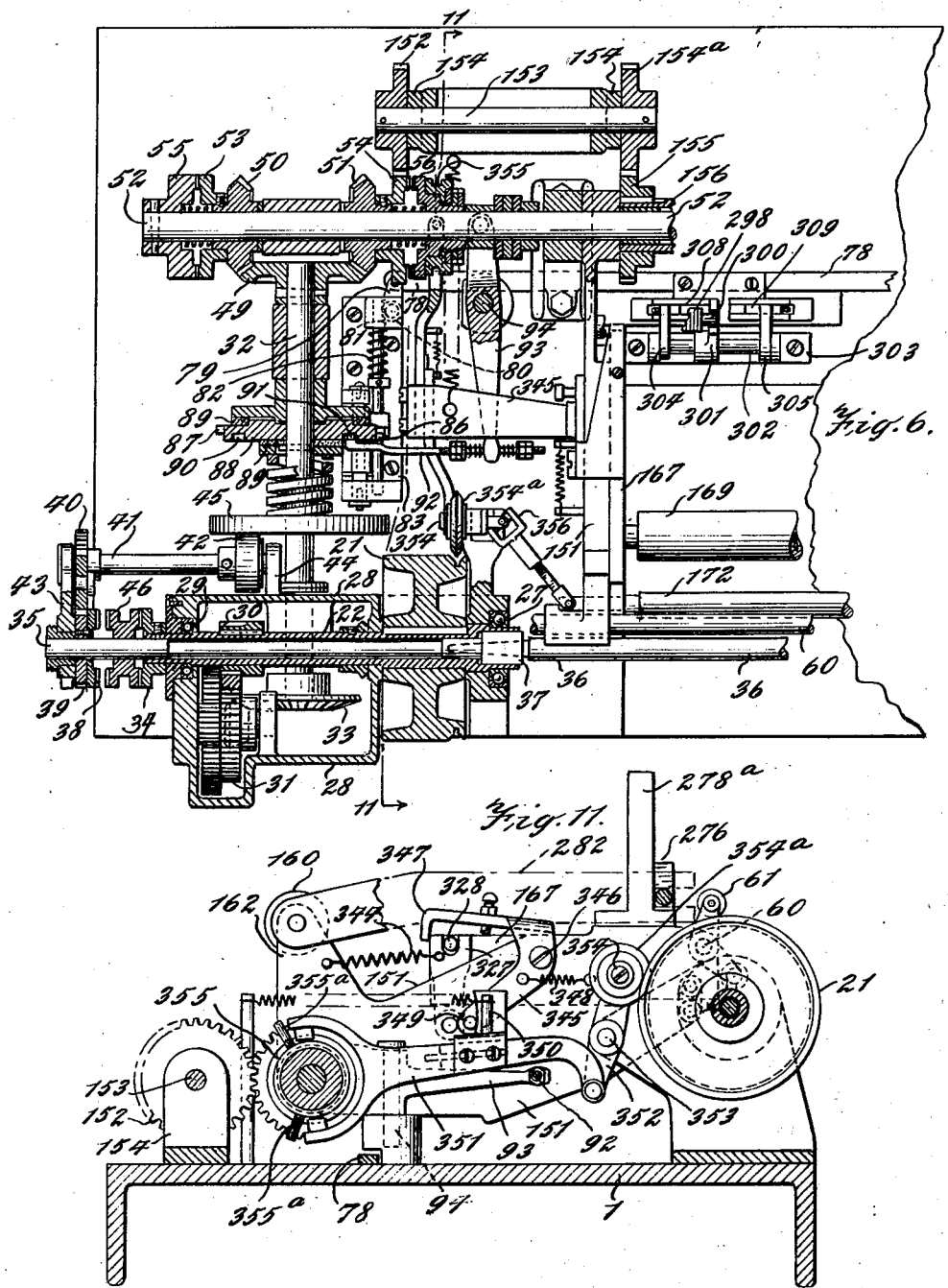
Inventor
Niels Pedersen
By his Attorney
Victor D. Borst

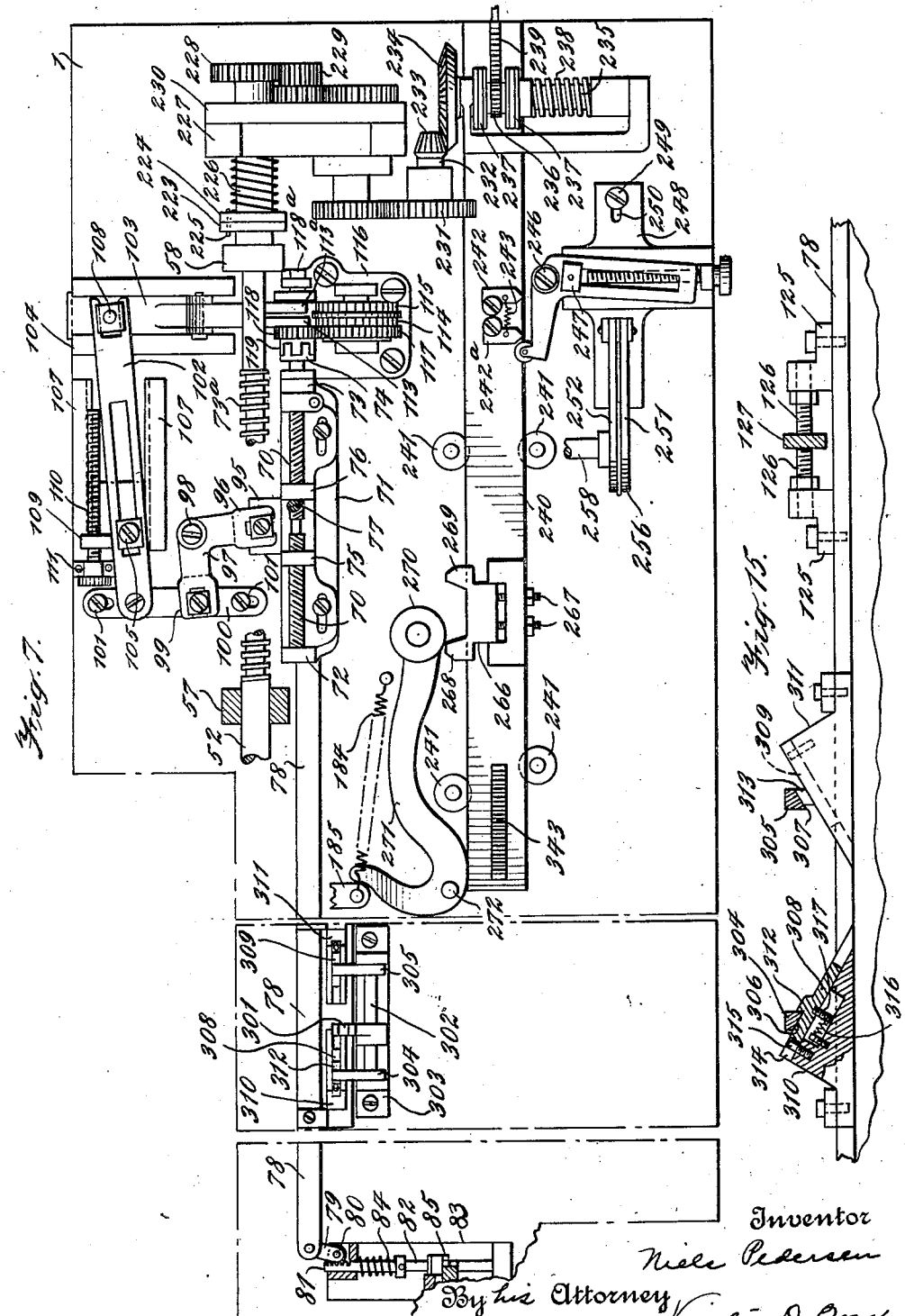

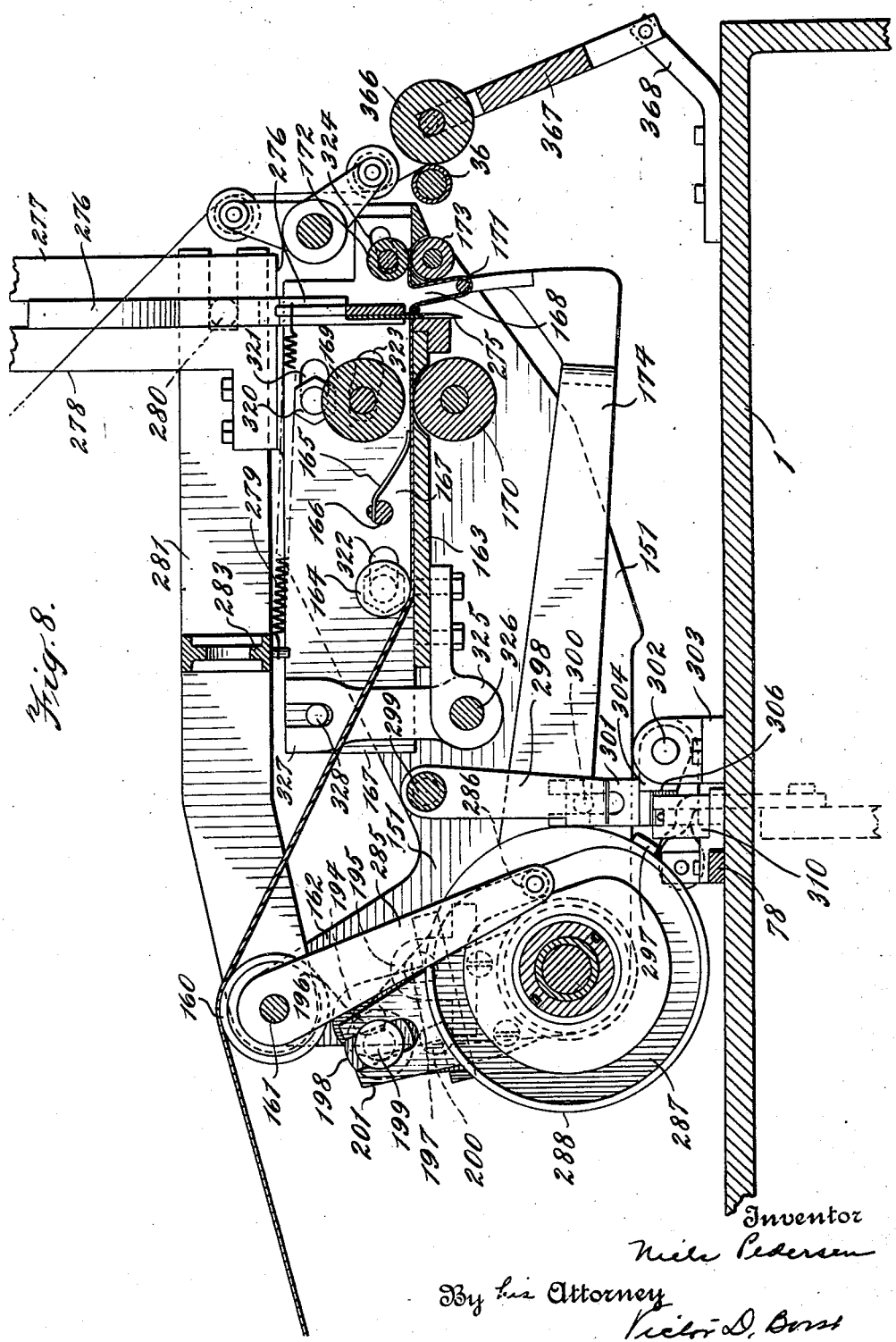

April 24, 1934.    N. PEDERSEN    1,955,761
WINDING MACHINE
Filed Feb. 4, 1927    10 Sheets-Sheet 9

Inventor
Niels Pedersen
By his Attorney
Victor D. Borst

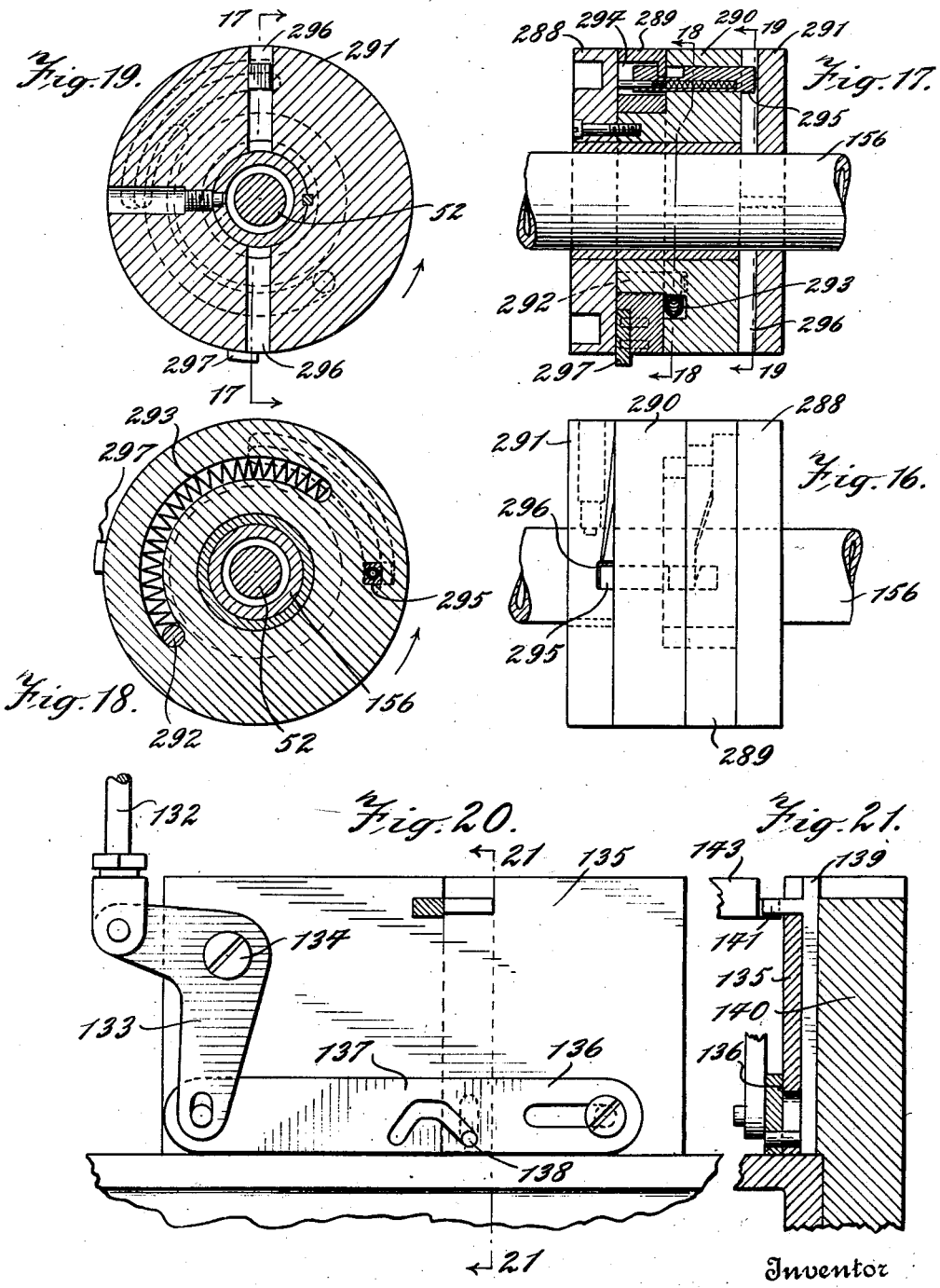

Patented Apr. 24, 1934

1,955,761

UNITED STATES PATENT OFFICE 1,955,761

WINDING MACHINE

Niels Pedersen, Philadelphia, Pa., assignor, by mesne assignments, to General Cable Corporation, New York, N. Y., a corporation of New Jersey Application February 4, 1927, Serial No. 165,781

82 Claims. (Cl. 242—10)

This invention relates to machines for winding strands of material such as wire, thread, ribbon or filaments into coil helices or bobbins and more particularly to machines for winding copper wire into coils for use in various kinds of electrical apparatus. The particular machine which will be herein described for the purpose of explaining the nature of this invention is of the same general character as those set forth in United States Patents Nos. 654,538, issued July 31, 1900; 1,368,536, issued February 15, 1921; 1,427,509, issued August 29, 1922; 1,521,372, issued December 30, 1924, and 1,547,274, issued July 28, 1925.

In these patented machines a plurality of coils are wound simultaneously in separated zones upon a single core or mandrel supported upon a spindle rotated by the machine, the convolutions of wire being wound in layers which are superposed one upon the other. The machines are adapted to inject sheets of paper between adjacent layers of each coil for insulating purposes during the winding or building up of the coils. These injected layers also form a new foundation for each layer of wire. The layers in all of the separated coils are finished simultaneously, at which instant a sheet of paper common to all the coils is inserted to make a wrapping around the coils. When the desired number of layers have been wound upon the mandrel, the machine is stopped and the spindle with all of the coils thereon is removed together as a unit. This wound mandrel is subsequently divided into individual coils by severing the layers of paper extending between the separated coils.

Machines of this nature are necessarily very complicated, involving many intricate movements and motions, and it is the purpose of this invention to simplify the usual structure of a machine of this type and yet produce a machine which is positive and reliable in its operation and adaptable to wind all kinds of coils.

It is within the contemplation of this invention to construct an improved machine which will automatically wind a series of coils and insert a layer or a plurality of layers of insulating material varying in length as the size of the coil increases between the successive layers of wire, smoothly and evenly upon the coil; which will automatically cause a pyramidical coil to be wound if so desired; and which will space the adjacent convolutions of any layer such as the first and last layers of wire on each coil an appreciable distance greater than the usual spacing in the rest of the winding.

In order to accomplish these results means are provided for driving the winding machine at two definite speeds, one while the paper is being inserted and one while the coil is being wound, and for "throwing" the sheets of insulating material into the bite of the coil being wound at the proper instant. Means are also provided whereby a single sheet or a plurality of sheets of insulating material may be fed and wound upon the coil and also whereby a single sheet of any desired length may be wrapped around the coil being wound. The stroke of the traverse member is automatically periodically or intermittently varied to produce a pyramidal coil and the degree of pyramiding may be varied at will. In order to simplify the operation a common control is utilized to affect the reversing of the traverse bar, to actuate the knife, and to operate the high and low speed variation. A common control is also used to control the paper measuring, the paper delivery, and the paper feeding mechanisms.

As a result of the structure to be later described, this invention provides a machine which is greatly simplified, and improved over the early machines of this type and which has a greater efficiency, flexibility and reliability. Other objects and advantages will appear from the following description of an embodiment of this invention and the novel device will be particularly pointed out hereinafter in the appended claims.

In the accompanying drawings which illustrate one embodiment of this invention,

Fig. 5 is a plan of the center portion taken below the top of the machine and partly in section;

Fig. 6 is a plan partly in section of the head end of the machine;

Fig. 7 is an enlarged plan detail of the pyramiding mechanism and associated elements;

Fig. 8 is an elevation partly in section on line 8—8 of Fig. 5;

Figure 3:
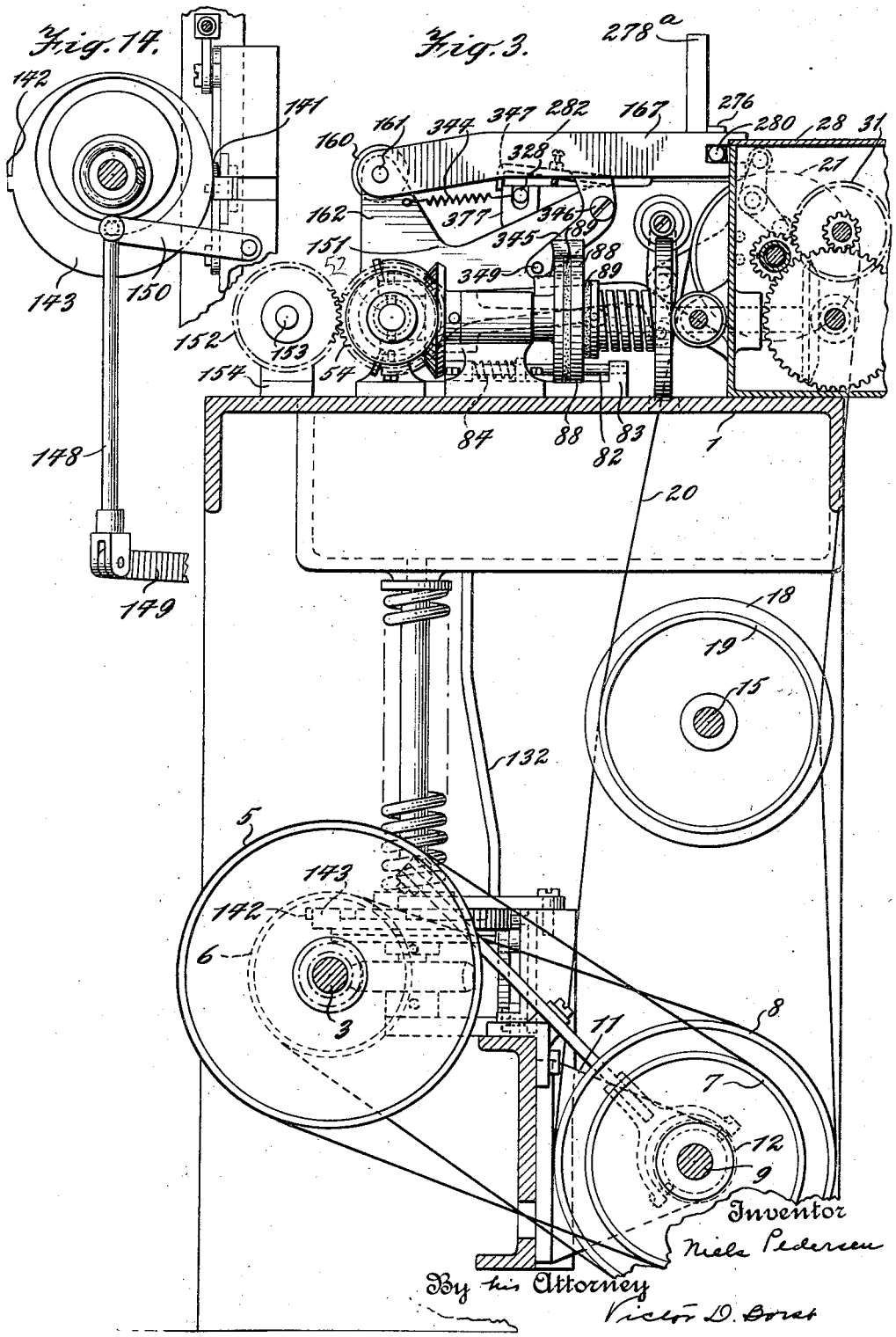
Fig. 3 is an end elevation partly in section along line 3—3 of Fig. 1 showing the opposite, left or head end of the machine.
Figure 4:
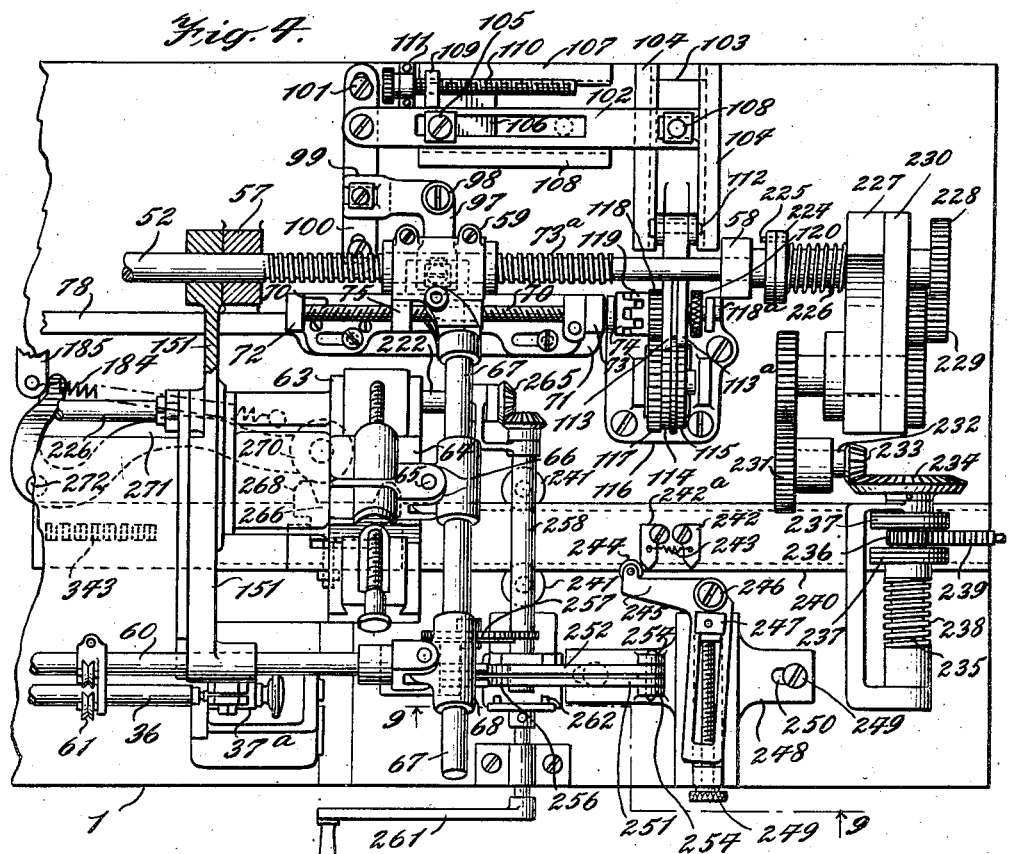
Fig. 4 is a plan partly in section of the tail end of the machine showing the pyramiding mechanism and certain elements of the traverse bar operating mechanism, certain details being omitted for purposes of clearness.
Figure 9:
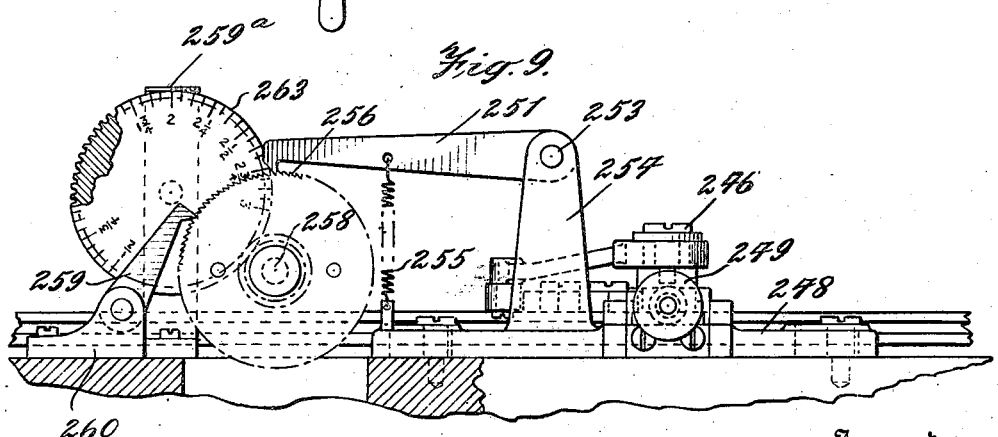
Figure 12:
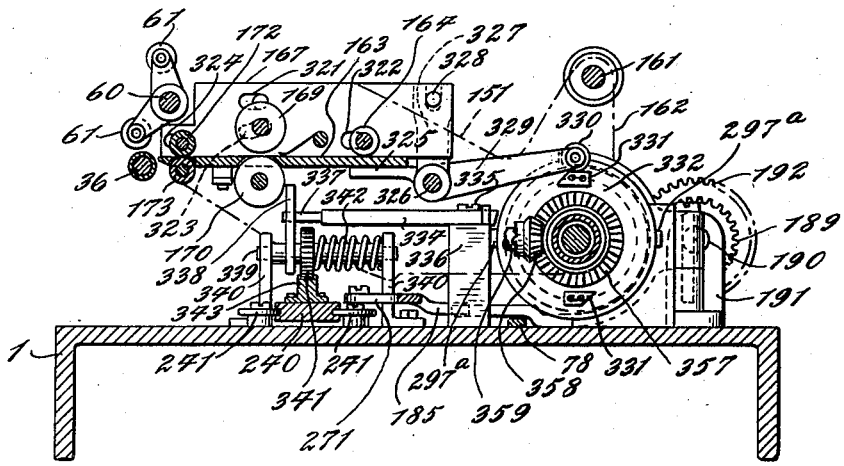
Figure 13:
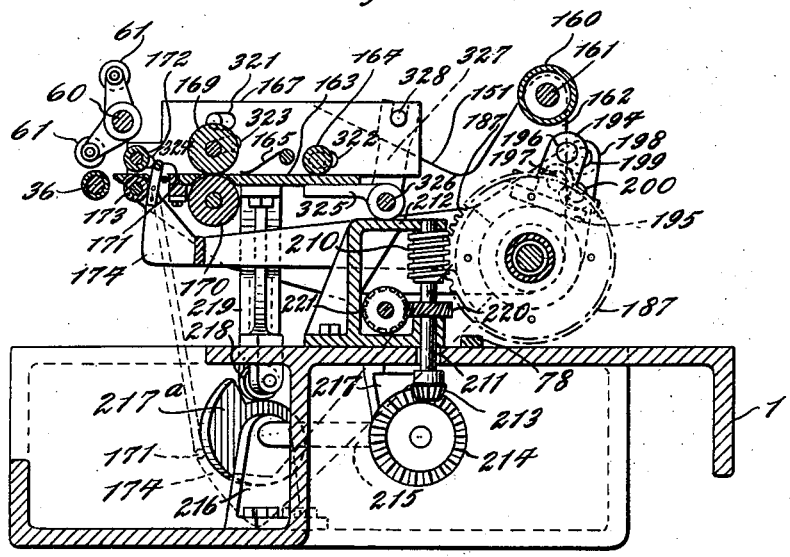

Fig. 9 is a detail elevation on line 9—9 of Fig. 4;
Fig. 10 is an elevation partly in section on line 10—10 of Fig. 5;
Fig. 11 is a section on line 11—11 of Fig. 6;
Fig. 12 is a section on line 12—12 of Fig. 5;
Fig. 13 is a section on line 13—13 of Fig. 5;
Fig. 14 is a plan view of a portion of the speed changing mechanism shown in the lower portion of Fig. 3;
Fig. 15 is a detail of the cam for controlling the knife clutch and stops for controlling the speed changing mechanism;
Fig. 16 is an elevation of the clutch used to operate the knife;
Fig. 17 is a section through the center of the same;
Fig. 18 is a section on line 18—18 of Fig. 17;
Fig. 19 is a section on line 19—19 of Fig. 17;
Fig. 20 is a detail of the speed changing mechanism, and
Fig. 21 is a section on line 21—21 of Fig. 20.

Figure 1:
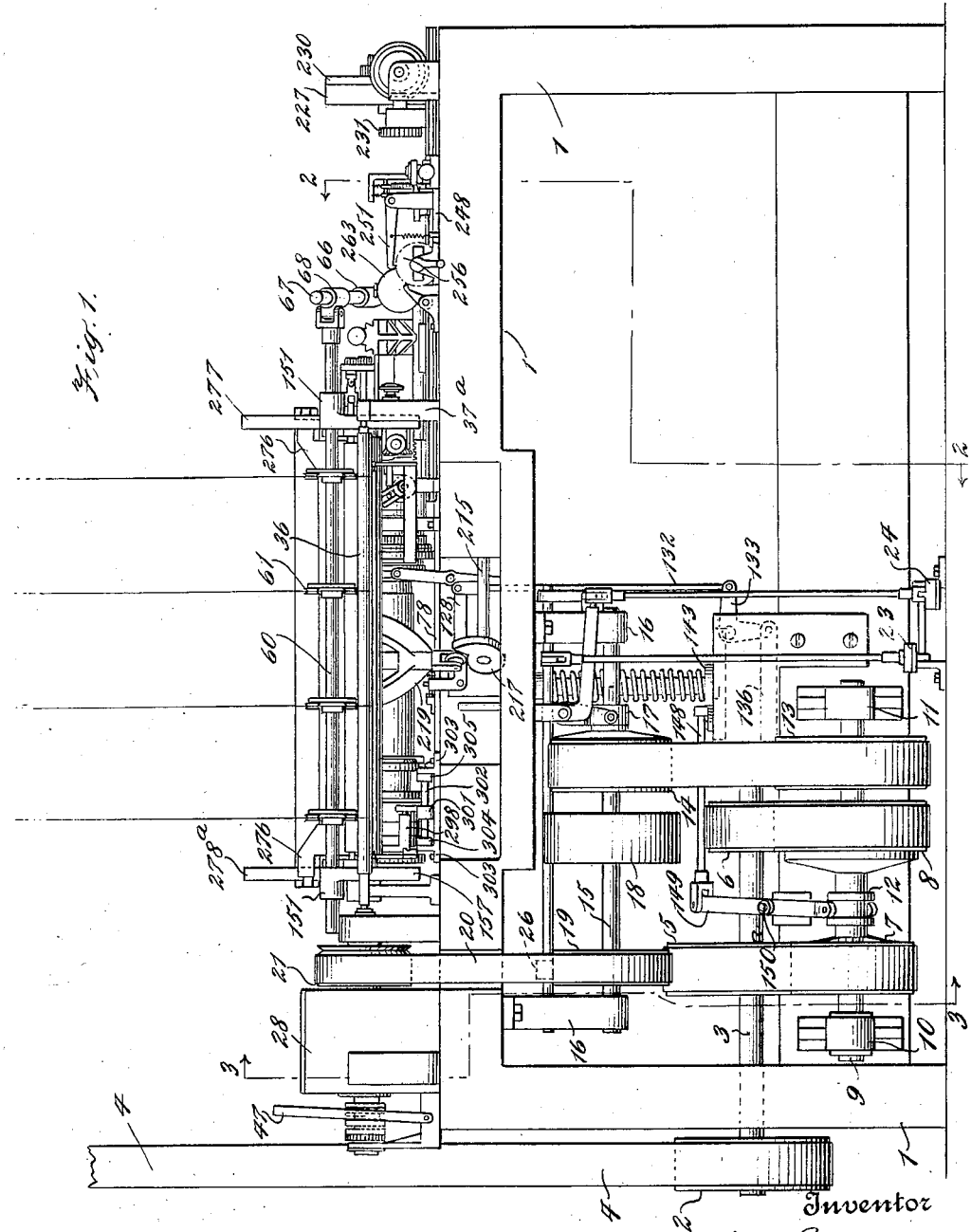
Fig. 1 is a front elevation of a machine constructed in accordance with this invention.
Figure 2:
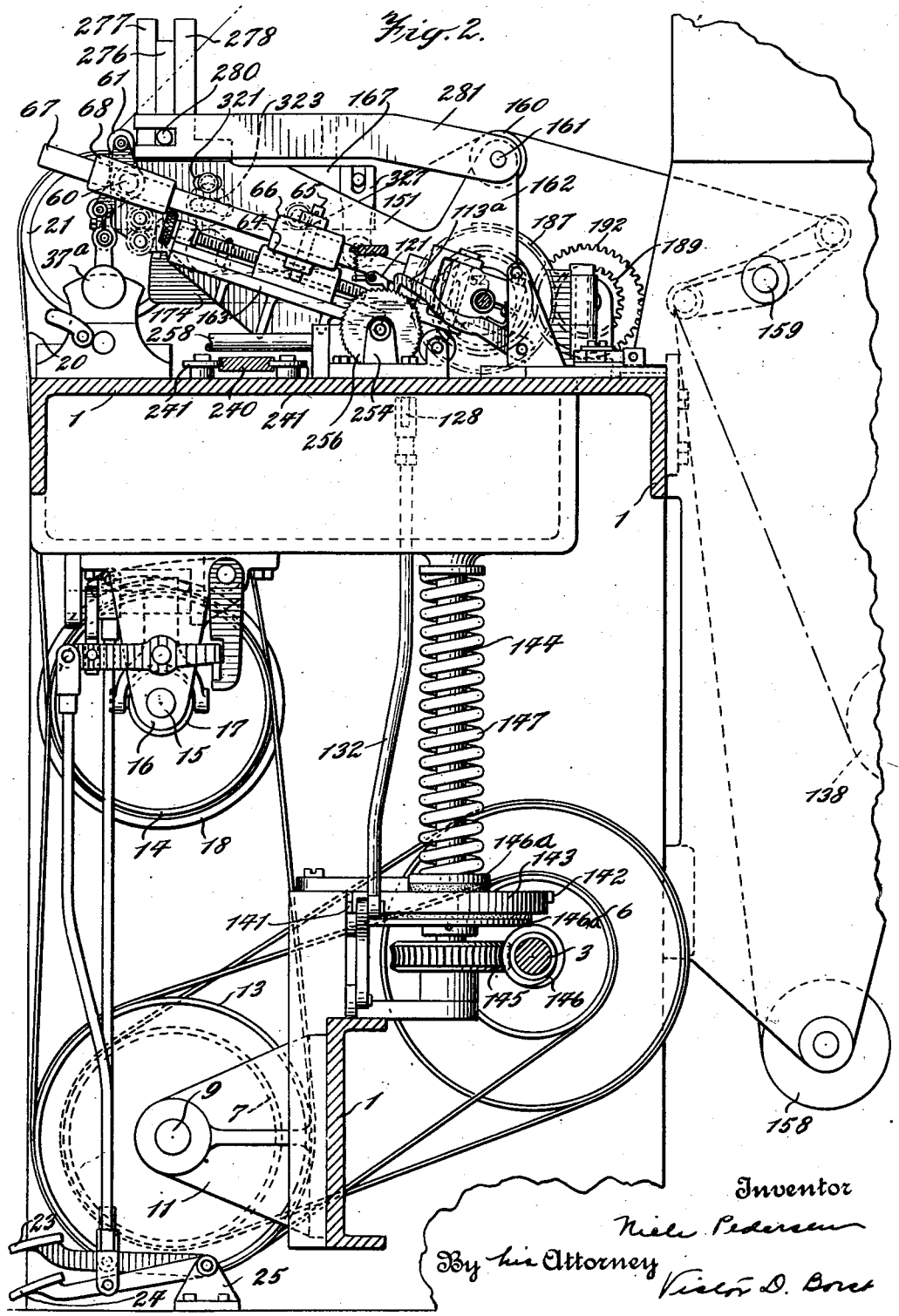
Fig. 2 is an end elevation partly in section taken along line 2—2 of Fig. 1 looking at the right or tail end of the machine.

In the illustrated embodiment of this invention, with particular reference to Figs. 1, 2 and 3, a suitable frame or base 1 serves as a general support for the operating mechanism. Any suitable source of power may be utilized as a prime mover to drive a pulley 2 fixed upon a shaft 3 through the medium of a transmission belt 4. Shaft 3 is rotatably mounted in suitable bearings in frame 1 and has fast thereon two additional pulleys 5 and 6, 5 being of larger diameter than 6. Pulleys 5 and 6 are belted to two loose pulleys 7 and 8, 7 being smaller than 8, and the two being carried by a short shaft 9 supported in bearings 10, 11 secured to a cross member of frame 1. Either pulley 7 or 8 may be clutched to shaft 9 at will by means of a clutch and clutch throw 12 operated by means to be later described so that shaft 9 may be driven at two different speeds. Shaft 9 has fast thereon a pulley 13 belted to a loose pulley 14 mounted upon a shaft 15 supported from hangers 16 carried by the frame. Pulley 14 may be connected at will to shaft 15 by means of any conventional clutch 17 so as to positively drive shaft 15. Shaft 15 also carries a balance or fly wheel 18 thereon and a fixed pulley 19 connected by means of a belt 20 to a pulley 21 keyed fast on a tubular driving shaft 22 (Fig. 6) of the winding mechanism. For convenience the clutch 17 is connected by a system of levers to pedals 23 and 24 pivoted in brackets 25 (Fig. 2) adapted to hold clutch 17 in or out of engagement and which may also apply a brake 26 to the shaft 15 by frictionally contacting with pulley 19.

The tubular shaft 22 (Fig. 6) is rotatably mounted in a suitable bearing 27 and extends through the housing 28 and into a bearing 29 in one end of the housing. Shaft 22 carries a pinion 30 which drives a gear 31 forming part of a train of reduction gears, mounted within housing 28, for driving a cross shaft 32 through a bevel gear 33 secured to the end thereof. The end of shaft 22 which extends through the bearing 29 in one end of the housing 28 has a toothed clutch element 34 secured to the end thereof by a set screw. Rotatably mounted within the tubular shaft 22 is a solid spindle shaft 35 one end of which is adapted to engage the spindle 36, which carries the coil form or spindle by means of any suitable chuck 37, the other end of the spindle 36 being supported by the usual tail piece 37a. The other end of shaft 36 extends through shaft 22 and has a clutch element 38 and a gear 39 rotatably mounted thereon, the clutch element and gear being bolted together. Gear 39 meshes with a gear 40 fast upon one end of a parallel shaft 41 which carries upon its other end a friction roller 42. The auxiliary shaft 41 is supported by a bracket 43 extending from the end of shaft 35, and by an arm 44. Friction roller 42 is adapted to be driven by engagement with a driving friction disk 45. Between the two clutch elements 34 and 38 there is positioned on shaft 35, so as to slide thereupon and rotate therewith, a double toothed clutch element 46. It is apparent therefore that with clutch element 46 engaging clutch 34, shaft 35 will be driven by and at the same speed as tubular shaft 22; while on the other hand with clutch element 46 engaging clutch 38 shaft 35 will be driven from disk 45 at a greatly reduced speed. For convenience a handle 47 (Fig. 1) is pivoted at 48 to the frame and is formed to engage the clutch element 46 to throw the clutch in either desired position.

The outer end of shaft 32 (Fig. 6) carries a bevel gear 49 for transmitting power to the entire mechanism with the exception of the winding spindle 36. Gear 49 meshes simultaneously with two spaced bevel gears 50 and 51 mounted for rotation upon a sliding and rotating shaft 52. Gear 50 has secured to it a toothed clutch element 53 whereas gear 51 has secured to it a toothed clutch element 54. Fast upon the left end of shaft 52 is a cooperating clutch element 55 adapted to be engaged with clutch 53, and also fast upon the shaft 52 is another clutch element 56 so positioned on the shaft that when clutch elements 55 and 53 are disengaged 56 and 54 are engaged. It is apparent that when shaft 52 is in its left position it will be driven in one direction and when in its right position it will be driven in a relatively reversed direction.

The right or tail end of shaft 52 is supported by suitable bearings 57 and 58 (Figs. 4 and 7) between which bearings the shaft 52 is threaded. A split nut 59 is threaded to engage the threaded portion of shaft 52, for reciprocating the usual traverse bar 60 upon which the necessary guide rollers 61 are placed. The mechanism for driving the traverse bar 60 is similar to that described in the patents above referred to and is briefly as follows: A block 63 having an adjustable support 64 thereon is secured to the frame 1. To the support is pivoted at 65 a sleeve 66 through which a rod 67 extends, the inner end of the rod being pivotally secured to the split nut 59 and the outer end slidingly engaged in a sleeve 68 pivoted to the traverse bar 60. It is obvious that as the shaft 52 rotates, split nut 59 is caused to travel over the threaded portion whereby rod 67 being pivoted at 65 will reciprocate the traverse bar 60. The length of stroke of bar 60 may be varied at will by adjusting the position of the support 64 which will change the position of the pivot 65. A short shaft 70 (Figs. 4 and 7) reversely threaded from its center toward each end is supported horizontally by a plate 71 mounted for limited sliding movement upon the frame 1. The plate has two upstanding ears 72, 73 which support the shaft 70 rotatably but not slidably in a position adjacent and parallel to the threaded portion 73a of shaft 52. The rod extends to the right and has one section of a modified Oldham joint 74 secured thereto for purposes to be later described. Two nuts 75 and 76 having one flat side contacting with the plate 71 are positioned apart on the shaft 70. As shaft 52 rotates and carries split nut 59 along, a pin 77 projecting therefrom will contact with one or the other of nuts 75 or 76 and move the plate 71 longitudinally. A cross-rod 78 is attached at one end to the plate 71 and extends longitudinally of the machine to the other end thereof, (Figs. 6 and 7) where it is pivotally connected to a short crank arm 79 having a pinion 80 secured thereto engaging with a rack 81 upon one end of a rod 82 mounted for axial sliding movement in a plate 83, the rod being constantly urged in one direction by a spring 84. The other end of rod 82 carries a pawl 85 adapted to interlock with either one of two lugs 86, 87 positioned diametrically opposite on the two opposed edges of the periphery of a reversing cam disk 88 positioned on shaft 32. Disk 88 is constantly urged to rotate with shaft 32 by means of two friction clutches 89, one on each side of cam disk 88 and fast on shaft 32, but is prevented from so rotating by engagement of lugs 86 and 87 with pawl 85. The reversing cam disk has a cam groove 90 formed therein, two diametrically opposite sections of which are unequally distant from the periphery thereof relatively to the other portions of the groove. Traveling in the groove is a roller 91 secured to one end of a rod 92 which is resiliently connected to one end of a lever 93 which is pivoted at 94 and has its other end secured to shaft 52. It will be seen that when pin 77 strikes either nut 75 or 76, slide 71 will be moved thereby moving rod 78 which will in turn actuate rod 82 to move the pawl 85 and thereby allow cam disk 88 to rotate one half revolution until pawl 85 strikes the diametrically opposite lug. Rotation of the cam disk will, through its groove 90, rod 92, and lever 93, shift shaft 52 so as to release either clutch 55 or 56 and engage the one previously released. In this manner the direction of rotation of shaft 52 is reversed after it has been rotated a predetermined number of revolutions as set and controlled by position of nuts 75 and 76. In other words after each stroke of the traverse bar the direction of rotation of shaft 52 is automatically reversed. The reversing mechanism and traverse bar mechanism is similar to that shown and described in detail in Patent #1,521,372, issued Dec. 30, 1924, to which reference is made for further detailed description relative to the above mechanisms.

To effect a pyramiding action so that pyramidal coils may automatically be wound upon this machine, plate 71 (Figs. 4 and 7) is formed with an ear 95 projecting rearwardly thereof to which is pivotally secured one bifurcated arm 96 of a bell crank 97 pivoted to the frame at 98. The other arm 99 of the crank is pivotally connected to a slide bar 100 adjacent one end thereof. Bar 100 is secured to the frame by two screws 101 passing through slots in the bar so as to permit limited sliding movement of the bar perpendicular to the shaft 52. A lever 102 is also attached at one end to the bar 100 adjacent the other end of bar 100, and at its other end is attached at 108 adjacent to one end of a slide 103 mounted parallel to bar 100 in horizontal dovetail guides 104 on the frame 1. Lever 102 is adjustably pivoted at 105 intermediate its ends to the base by means of a pivot extending through an elongated slot in the lever comprising a block 106 slidably mounted between two dovetail guides 107 in the frame and parallel to shaft 52. Block 106 has an upstanding ear 109 which is threaded to receive an adjusting screw 110 which is threaded into a lug 111 extending upwardly from the frame so that rotation of the screw will move block 106 along the guides 107 to change the fulcrum or pivot point of lever 102. Hinged at 112 to the forward end of the slide 103 are two pawls 113, 113a contacting with a pair of ratchets 114 and 115 respectively mounted on a stud carried by bearings in a plate 116 secured to the frame.

Fast to ratchet 114 is a spur gear 117 meshing with gear 118 mounted on a stud 118a supported from plate 116. To gear 118 is attached the other half 119 of the modified Oldham joint 74, the tongues of which are made long enough to permit of the necessary axial movement of the rod 70 without breaking the connection. From the foregoing construction it follows that for every movement to the left of plate 71 crank 97 will likewise be moved and will rotate rod 70 through slide 100, lever 102, slide 103, pawls 113, 113a, ratchets 114, 115 and gears 117 and 118, thereby bringing the nuts 75, 76 closer together. This will shorten the stroke of the traverse bar each time it makes a complete movement and return. To permit manual rotation of rod 100 for initial settling of nuts 75 and 76, the stud 118a is provided with a knurled finger nut 120. To prevent return movement of the ratchets 114, 115 a pair of pawls 121 are positioned above the ratchets in relatively reversed position and spring-pressed against the ratchets (see Fig. 2).

It has been found advantageous that when large sheets of paper are to be inserted between the layers, that is when a long spindle is being wound, to reduce the speed of the machine to prevent undue wrinkling of the paper as would otherwise occur when feeding large sheets at high speeds. To this end the machine is constructed to automatically run at a reduced speed at approximately each end of a stroke of the traverse bar.

Secured to the cross rod 78 of the reversing mechanism at approximately the center thereof (Figs. 5 and 10) are two spaced angle brackets 125 into the upstanding arms of which are threaded two studs 126 so that their ends come together and engage therebetween one end 127 of a bell crank lever 128 pivoted at 129 for vertical movement upon a bracket 130 secured to the frame 1. The opposite end 131 of lever 128 is swiveled to a vertical rod 132. Rod 132 projects downwardly and is pivotally attached to one arm of a bell crank 133 (Figs. 2, 3 and 20) pivoted at 134 to a vertical plate 135. The other arm of the crank 133 is pinned to a sliding cam link 136 which has a cam slot 137 therein adapted to engage a pin 138 on a locking pawl 139. Pawl 139 is mounted for sliding movement between plate 135 and a short cross member 140 of frame 1 (Fig. 20) and is adapted to engage either of two lugs 141, 142 positioned diametrically opposite on the periphery adjacent the upper and lower surfaces respectively of a horizontal cam disk 143. With pin 138 at either end of cam slot 137, pawl 139 will engage the lower lug 141, but during the short period while pin 138 engages the center portion of slot 137, pawl 139 will contact with the upper lug 142 on cam disk 143.

Cam disk 143 is rotatably carried by a vertical shaft 144 upon which is secured a worm wheel 145 driven by a worm 146 fast upon the driving shaft 3. Two friction faced collars 146a are pinned to shaft 144, one upon each side of cam disk 143, the upper collar being spring-pressed against the disk by a spring 147 under compression on shaft 144 between the frame 1 and collar 146. Worm 146, worm wheel 145 and collars 146, tend to continuously rotate cam disk 143 but the disk is normally held stationary by contact of pawl 139 with the lower lug 141. Cam disk 143 has an eccentric groove in one face thereof (Fig. 14) in which a roller upon one end of a rod 148 travels, the other end of said rod being connected to one end of a shift lever 149, the roller end of rod 148 being held from lateral movement by a link 150 pivoted to the rod and to the frame. Lever 149 is pivoted at 150a and terminates in a fork engaging the clutch throw 12 whereby the shaft 9 may be clutched to either pulley 7 or 8 to selectively drive said shaft at either of two speeds.

From the foregoing it follows that as rod 78 moves sidewise at the conclusion of each layer upon the coil in its reversing action it will actuate lever 128 which through rod 132 and crank 133 will slide cam link 136 which in turn will raise pawl 139 and permit cam disk 143 to make one-half revolution thereby shifting the clutch throw 12 to drive shaft 9 from pulley 7 instead of from pulley 8. Due to the shape of slot 137 in link 136, pawl 139 will hold the clutch in engagement with the lower speed during the period in which paper is fed to the winding spindle after which pawl 139 will release lug 142 and the cam 143 will be allowed to rotate another half revolution and throw the machine again into high speed. This action takes place at approximately each end of the stroke of the traverse bar, the exact timing of its action being adjustable by altering the position of studs 126.

The paper measuring, severing and feeding mechanism is all carried upon a pivoted carriage comprising a table 163 and two spaced end plates 151, 151 hinged upon the shaft 52 and which plates also constitute the supporting means between and upon which the necessary feed rolls and paper trimming and measuring mechanisms are positioned. Motion is imparted to these units by a tubular shaft 156 (Figs. 3, 6 and 11), which shaft is rotated by means of a spur gear 152 fast on one end of a short shaft 153 rotatably supported on standards 154 fastened upon frame 1, gear 152 meshing with teeth cut upon the periphery of the clutch element 54 secured to gear 51. The opposite end of shaft 153 carries a gear 154a which meshes with a gear 155 fast upon a sleeve or tubular cam shaft 156 coaxial with and surrounding shaft 52 for a portion of its length, which tubular shaft carries the necessary cams and clutches for operating the paper mechanisms to be later described.

One or more sheets of paper 157 are fed from the usual rolls 158 (Fig. 2) supported upon the frame at the rear of the machine, over the usual equalizing or tension bar 159, over a guide roll 160 rotatably mounted upon a shaft 161 supported by and between two upstanding arms 162 extending from plates 151. The paper then passes on to a table 163 (Fig. 8.) secured to and extending between plates 151 and under a second guide roll 164 rotatably mounted just above the table 163, the table forming the bed of the carriage and is also supported by and between plates 151. The paper is also held down upon the table by a series of spring fingers 165 carried upon a horizontal rod 166 secured at each end to a cam plate 167, which plates also support the roll 164.

After passing under presser fingers 164 the paper passes over an opening in the table and between two feed rolls 169 and 170 which feed the paper toward the outer end of table 163, and over a second slot 168 in the table through which a measuring rod 171 reciprocates and into the bite of a pair of accelerating rolls 172, 173. The operation of these rolls will be described in detail as the description proceeds.

The measuring rod 171 extends across slot 168 in the table and terminates into two bent arms 174 (Fig. 5) which extend rearwardly and are secured by screws or the like to two disks 175, 176 (Figs. 5 and 10) fast upon opposite ends of a sleeve 177 coaxial with and rotatably mounted upon cam shaft 156. Sleeve 177 and measuring rod 171 are constantly urged in their upper position by means of a weight 178 attached to the outer end of an arm 179 clamped upon sleeve 177 at approximately the center thereof. Keyed to cam shaft 156 near the right end thereof is a flanged collar 180 (Figs. 5 and 10) to which collar is secured, so as to rotate therewith, a flanged sleeve or bushing 181. A disk 182 is attached to the bushing 181 so as to be driven thereby and faced with a friction washer 183 which washer is adapted to contact with disk 176 to rotate the same when the pressure against friction washer 183 is great enough. The collar bushing and disk are axially slidable upon cam shaft 156 and are constantly urged to the right by a tension spring 184 attached at one end to a fork lever 185 pivoted at 186 and engaging collar 180 thus holding disk 176 normally out of engagement with friction washer 183. Means for periodically engaging the friction washer will be later described.

Rotatably mounted upon bushing 181 (Figs. 5, 10 and 13) is a worm wheel 187 to which is secured a gear 188. A gear 189 is rotatably mounted upon a stud 190 carried by brackets 191 supported by frame 1. A second gear 192 larger than gear 189 is also mounted upon the stud adjacent to gear 189 and is fastened to said latter gear to rotate therewith. Gear 192 meshes with a gear 193 rotatably positioned adjacent gear 188 or bushing 181.

Gears 188 and 193 have a portion of their peripheries cut away and have projecting arms 194, 195 secured respectively thereto, arm 195 on gear 193 being shorter than arm 194 on gear 188. These arms 194 and 195 carry laterally projecting pins 196 and 197 respectively in their outer ends which extend toward disk 176 which disk has a projection 198 extending therefrom in the extremity of which is slidably mounted a pin 199 and below which is fixedly mounted a pin 200. Pin 196 is positioned to contact with 199 and pin 197 is positioned to contact with pin 200 to selectively limit the stroke of the measuring rod. Pin 199 is supported by a bracket 201 attached to a sliding flanged collar 202 slidably mounted upon a reduced end portion 203 of sleeve 177. A fork member 204 pivoted at 205 engages between the flanges of collar 202 to slide the collar axially to withdraw the pin 200 when desired. A short lever 206 is pivotally connected to the end of the fork member at one end and to one edge of a disk 207 at the other end. Disk 207 is mounted for rotation upon the frame and has an upstanding handle 208 whereby the pin 200 may be withdrawn at will by rotating said disk so as not to contact with pin 196.

Worm wheel 187 engages a worm 210 secured to a vertical shaft 211 (Fig. 13) rotatably supported in a U-shaped bracket 212 bolted to a portion of the machine frame. Shaft 211 also carries at its lower end a bevel gear 213 which meshes with another bevel gear 214 fast upon an end of a short cam shaft 215 hung on brackets 216 and 217 from frame 1. Shaft 215 carries upon its opposite end a cam disk 217a adapted to peripherally engage a cam roller 218 rotatably carried in one end of an arm 219, the other end of which is bolted to the table 163. Cam 217 is so designed that rotation thereof will raise or lower table 163 to various levels according to the size of the coil being wound upon the spindle.

Shaft 211 also carries a helical gear 220 intermediate its ends which gear is driven by a gear 221 fast upon one end of a shaft 222 which is indirectly driven from shaft 52 by intermediate mechanism to be now described.

A flange 223 is secured to the extreme right end of shaft 52 (Figs. 4 and 7) and is pinned to a flange 224 fast upon a shaft 226 supported on a bearing block 227 by a pin 225 of relatively small diameter so as to be adapted to shear under any undue strains. A gear 228 is secured to the outer end of shaft 226 and engages with one of a train of gears 229 carried by a yoke 230 so as to be removable and replaceable. The train of gears drives a spur gear 231 fast upon a stub shaft 232 which carries a bevel gear 233 driving another bevel gear 234 fast upon one end of a shaft 235 supported in a bracket 235a. Intermediate the ends of shaft 235 a spur gear 236 is frictionally secured to said shaft by a pair of friction disk clutches 237 of the usual construction held frictionally to the gear by a spring 238. Gear 236 engages a rack 239 upon one end of a reciprocating slide bar 240 mounted for horizontal reciprocatory movement between rollers 241 supported from the frame and engaging grooves in the edges of the slide bar.

It readily follows that as shaft 52 is rotated in one direction, bar 240 will be moved in one direction, and when shaft 52 is reversed and rotated in the other direction bar 240 will likewise be moved in the reverse direction, therefore as the machine is operated bar 240 will be reciprocated.

Two spaced and opposed cam levers 242 and 242a (Figs. 4, 7 and 9) are pivotally secured to the bar 240 so as to move therewith and to be movable about their pivots in one direction oppositely to each other and are spring tensioned to one normal position by a spring 243. The ends of these levers are tapered and are adapted to contact with a roller 244 mounted in the end of one arm of a bell crank 245 pivoted at 246 to the frame. The other arm of the crank is slotted to adjustably receive a block 247 adjustably secured in a reciprocatory slide 248 by means of a screw 249. Slide 248 is secured to the frame by two screws 249 or the like extending through elongated slots 250 which permit the slide to be reciprocated horizontally toward right or left.

Two pawls 251 and 252 are attached to the member 248 by a pin 253 extending through said pawls and through two ears 254 extending upwardly from slide 248. A pair of springs 255 hold the pawls normally down in engagement with a pair of ratchet wheels 256 and 257 secured to a shaft 258. The notches in the two ratchets are alternated relatively to each other to be responsive to slight movements of the pawls. Additional pawls 259 are supported in brackets 260 and are positioned to engage ratchets 256 and 257 to prevent said ratchets from rotating in the reverse direction. A manual means of rotating the shaft 258 is provided in the form of a crank handle 261 having a detachable connection 262 to ratchet 256. A graduated dial 263 is geared to shaft 258 and an indicator 259a placed over the dial to indicate the relative position of the shaft. The other end of shaft 258 carries a bevel gear 264 which engages with a bevel gear 265 secured to the opposite end of shaft 222 which carries helical gear 221.

It follows therefore that the reversed rotation of shaft 52 will reciprocate bar 240 (Fig. 4), which in turn will actuate crank 245 once for each movement. That is as bar 240 moves to the left, lever 242a will contact with roller 244 and cause said roller to ride over the pivoted end of the lever thereby swinging crank 245. Further movement of the bar will bring lever 242 into contact with roller 244 but lever 242 will swing upon its pivot and not move crank 245. On the reverse movement of the bar, lever 242 will actuate the crank and lever 242a will swing upon its pivot. Crank 245 will reciprocate slide 258 which through its attached pawls 256 and 257 will intermittently rotate shaft 258 (Fig. 9) which in turn will drive shaft 222 and shaft 211 (Fig. 13). Shaft 211 drives two sets of mechanisms, first the cam 217 for raising the carriage, and second the worm wheel 187 which drives the paper measuring control gears 188 and 193, gear 193 being driven relatively farther than 188 through the gears 192 and 199. Gears 188 and 193 carry the limiting pins 196 and 197 for limiting the stroke of the measuring rod 171 driven through the friction disk 183.

Slide bar 240 also carries block 266, adjustable transversely to the bar by means of screws 267. Block 266 has two projecting lugs 268 and 269 spaced apart a distance slightly less than the sliding movement of said bar. These lugs (Fig. 7) contact one after the other with a roller 270 carried by one end of a hook 271 pivoted at 272, the other end of which bears against the fork lever 185 (Figs. 5 and 7).

It follows then that for each stroke of the bar 240, roller 270 will ride up upon either lug 268 or 269, swing the hook 271 upon its pivot 272 and force fork lever 185 toward the left, thereby engaging the friction clutch disk 183 and actuating the measuring mechanism to measure a sheet of paper.

The paper after having been measured is severed by a knife 275 (Fig. 8) which may have any desired contour to its edge, it having been found satisfactory to form the knife with a serrated or saw tooth edge. Knife 275 is secured to a vertical slide 276 and is adapted to be reciprocated vertically through the opening 168 in table 163 and against the rearward edge of said opening, against which it is spring-pressed, said edge giving a shearing effect in combination with said knife edge. Slide 276 is guided between two upright guides 277 and 278 upon its right end (Figs. 2 and 8) and against one rear guide 278a upon the left end (Figs. 3 and 11). A spring 279 serves to hold the knife against the rear guide upon the left end. A pin 280 in each end of slide 276 engages in a slot in the outer ends of two arms 281 and 282 at each end of the carriage, the arms being tied together by a cross member 283 and pivoted upon the shaft 161 extending between the two upwardly extending arms 162 of end plates 151.

A cam lever 285 (Fig. 8) is secured to arm 282 to pivot therewith and carries at its outer end a roller 286 which travels in a cam groove 287 in cam disk 288. Cam disk 288 is mounted on shaft 156 and is adapted to be intermittently driven thereby through a clutch such as is commonly used on punch presses and is shown in detail in Figs. 5, 16, 17, 18 and 19. Referring to the above figures, it will be seen that disk 288 is secured to a clutch composed of three elements, namely a clutch cam disk 289, an intermediate disk 290 to which disk 288 is bolted, and a driving disk 291. Disk 289 carries a pin 292 rigidly secured thereto which extends into an arcuate slot in disk 290 and is constantly urged toward one end of said slot by a spring 293. Disk 289 also has a cam groove 294 therein for controlling the movement of a pin 295 which extends from disk 259 through disk 290 and the end thereof engaging in either of two slots 296 in disk 291 fast upon shaft 156 when permitted to do so. Disk 289 also carries a projecting lug 297 upon its periphery adapted to be engaged by a stop lever 298 pivoted for swinging motion at 299 (Figs. 8 and 10) to one of plates 151. Lever 298 extends downwardly from its pivot 299 (Figs. 1, 8 and 10) and to the right and engages the lug 297 when in normal position. The end portion of lever 298 is reduced to a pin 300 which engages in the forked end of an angle arm 301 secured at its other end to a rock shaft 302 rotatably supported in two spaced brackets 303 bolted to frame 1. A pair of arms 304 and 305 (Figs. 1, 6, 8 and 10) having inclined surfaces 306 and 307 are pinned to the rock shaft 302 to rock therewith one on each side of fork 301, the arms 304 and 305 are positioned to contact with two slide members 308 and 309 mounted to reciprocate with rod 78, (Fig. 15). Members 308 and 309 are mounted each for sliding movement relatively to rod 78 in one and relatively opposite directions only upon two inclined blocks 310 and 311 attached by means of screws or the like with their inclined surfaces relatively reversed to rod 78. Members 308 and 309 have projecting fingers 312 and 313 respectively extending upwardly from their inclined surfaces forming shoulders therewith. One end of these members is slotted as at 314 to receive the projecting end of a pin 315 threaded into blocks 310 and 311 thereby limiting the sliding movement of members 308 and 309 upon blocks 310 and 311. Blocks 310 and 311 are channeled to receive a pin 315 threaded thereinto and also a spring 316 and pin 317 threaded into the under side of members 308 and 309 to normally bias said members in their upper position.

As rod 78 is reciprocated in response to movements of the traverse bar, blocks 310 and 311 will move toward the right and left. During the movement to the left, slide member 309 will force arm 305 upwardly through contact with its inclined surface 307 and finger 313, whereas the finger 312 on slide member 308 will engage the edge of surface 306 and slide member 308 will yield down the incline till the finger 312 clears the edge of surface 306 when spring 316 will draw member 308 back to its normal position (Fig. 15). When rod 78 moves to the right, the action will be just the reverse, that is, member 309 will yield while member 308 will raise arm 304. The raising of arms 304 and 305, one for each stroke of rod 78, will rock shaft 302 and thereby rock fork 301 to the right which will move lever 298 out of holding contact with lug 297. This will allow disk 289 to be rotated relatively to the other clutch elements by action of spring 293 thus allowing pin 295 to engage driving disk 291. Cam disk 288 will then be rotated causing knife 275 to make its cutting stroke after which lever 298 will again engage lug 297, stop the rotation of disk 289 and will draw pin 295 from disk 291 disengaging the clutch. It follows that rod 78 controls the reversing mechanism, the two speed mechanism and the knife mechanism and causes each to act in its proper time and proper sequence.

Referring again to Figs. 2, 3, 8, 11, 12 and 13 and to the paper feeding mechanism, it will be seen that the two cam plates 167 are positioned upon table 163, one adjacent each end plate 151, for sliding movement forward and rearward upon one edge thereof. The cam plates are secured for sliding movement to the plates 151 (Fig. 8) by means of bolts 320 extending through slot 321 in the cam plates into plates 151 which bolts and slots also limit the movement of the cams. The cam plates also constitute end bearings for the guide roller 164, upper feed roll 169 and upper accelerating roll 172 (see Figs. 8, 12 and 13), the lower feed roll 170 and accelerating roll 173 being journaled in plates 151. For this purpose cam plates 167 have horizontal slots 322 cut therein forming bearings for guide roller 164, inclined slots 323 forming bearings for roll 169 and reversely inclined slots 324 forming bearings for roll 173. A pair of brackets 325 are attached to the rear under side of table 163 which support a rock shaft 326. Secured to the rock shaft 326 adjacent each end thereof are two arms 327 having bifurcated end portions which engage a pin 328 rigidly positioned in the upper rear corner of cam plates 167. A lever 329 (Fig. 12) is secured to shaft 326 and carries upon its outer end a roller 330 adapted to contact with inclined cam lugs 331 mounted upon a cam disk 332 (Fig. 5) which constitutes the driven member of an intermittently operating clutch 333. This clutch is similar in structure to the clutch operating the knife, with the exception that the clutch cam disk 289a (Figs. 5 and 10) is provided with two lugs 297a diametrically disposed and positioned on opposite edges of the periphery of clutch cam disk 289a, there being two such lugs so as to make the clutch operable at every half revolution instead of every complete revolution of disk 289a. The lugs are adapted to be engaged sequentially by the reduced end of a lever 334 (Figs. 12 and 5) pivoted at 335 upon a block 336 supported from the frame, the opposite end 337 of which is reduced and extends between the forks of a bifurcated arm 338 (Figs. 1 and 12) secured to a rock shaft 339 mounted between two brackets 340. A pinion 341 is also secured to shaft 339 and is yieldingly held in axial position by a spring 342 and engages with a rack 343 attached to bar 240.

A tension spring 344 acts to normally urge the plates 167 in their rearward position (Fig. 13) thereby holding feed rolls 169 and 170 closed whereas the lever 329 when actuated by the clutch 333 will move the plates forward (Figs. 8 and 12), closing the accelerating rolls 172 and 173 and opening the feed rolls. The plates are held in the forward position by a locking lever 345 pivoted at 346 to left plate 151 which has a finger portion or catch 347 which extends over the upper rear corner of the left cam plate 167. A spring 348 biases the lever to engage the corner of plate 167 to retain it in its forward position. The lower end of lever 345 carries a projecting pin 349 adapted to be engaged and tripped by another pin 350 adjustably mounted upon the actuating arm 351 (Fig. 11) of the accelerating roll driving mechanism which is similar to that described in the Patent #1,521,372 referred to previously in this specification.

In brief this mechanism is as follows: A lever 352 (Figs. 6 and 11) pivoted at 353 rotatably carries a spindle 354 upon which is mounted a friction disk 354a on one end adapted to engage in a groove cut in pulley 21 and is connected at the other end to an actuating arm 351. Arm 351 is forked at the other end to engage a collar 355 secured to reverse clutch member 56 and to which is secured pins 355a. Spindle 354 is connected to the upper accelerating roll by means of a knuckle or universal joint 356. The lower accelerating roll 173 is journaled in end plates 151 as previously stated and geared to the upper roll at the right ends of the rolls.

The feed rolls 167 and 170 are driven from clutch 333 by a bevel gear 357 (Figs. 5, 10 and 12) rigidly secured to disk 332 which is intermittently driven by clutch 333. A bevel gear 358 mounted upon one end of a shaft 359 rotatably supported by a bracket 360 extending from the right end plate 151 meshes with bevel gear 357 and is driven therefrom. The other end of shaft 359 is connected by means of a flexible coupling 361 (Fig. (5) to a bevel gear 362, which coacts with bevel gear 363 fast upon the upper feed roll 169. Roll 169 also has upon one end a spur gear 364 which coacts with spur gear 365 upon the lower feed roll 170 so that both rolls are positively driven.

The customary presser roll 366 (Fig. 8) carried by a pair of links 367 supported from a bracket 368 bolted to the frame 1 is provided so as to bear against the winding being wound upon the spindle.

The operation of the paper mechanism is as follows: The paper after leaving the guide roll 164 passes along table 163 and is grasped between the bite of feed rolls 169 and 170, the plates being in their normally, rearward position, and the rolls therefor being closed. At this point bar 240 has moved sufficiently to throw lever 334 to release disk 289 permitting clutch 334 to drive disk 332 and thereby rotate the feed rolls 169 and 170 and then move plates 167 forward. This action opens feed rolls 169 and 170 and closes accelerating rolls 172 and 173.

The plates 167 having been moved forward, they are temporarily locked by catch 347. With the paper thus gripped by rolls 172 and 173, the measuring rod 171 descends from its normally upward position and pulls a loop of paper through opening 168 in table 163 and measures a length of paper according to the setting of pins 196, 197 and 199. Knife 275 then descends and severs the paper, springs 165 serving to hold the rear end of the paper. As the traverse bar 60 reaches the end of its stroke and reversing mechanism functions, arm 351 is retracted thereby permitting disk 354a to engage pulley 60 to rotate the accelerating rolls to shoot the paper into the bite of the wire and spindle. As the reversing mechanism continues to function, pin 355a will strike arm 351 and withdraw disk 354a. It is to be noted that as arm 351 goes rearward to permit disk 354a to engage pulley 21, pin 350 engages pin 349 and raises catch 347 to permit plates 167 to be moved rearwardly. Pin 350 is so positioned on arm 351 that this unlocking action takes place after the accelerating rolls have been spun. After plates 171 have been moved rearwardly and disk 354a withdrawn, the cycle of operations just described is ready to be repeated at the proper time.

For further details as to the reversing mechanism, the traverse bar mechanism, and the accelerating roll drive mechanism, reference is made to the patents cited wherein similar mechanisms are described in detail. As in those machines, any suitable wire feeding device may be utilized to lead and guide the necessary strands of wire to the traverse bar.

In general, the operation of this machine is similar to that described in the patented art, and in brief, is as follows: The operator feeds a sheet or sheets of paper from the supply rolls over the equalizing tension arm 159, over roll 160 and on to table 163 under roll 164 and fingers 165 thence between feed rolls 169, and 170, and into the bite of the accelerating rolls 172 and 173. A spindle with or without a core thereupon is placed in the machine to be engaged by the chuck 37 and tail piece 37a, threads of wire are then brought down from the take-off means (not shown in the drawings) over the guide pulleys 61 and attached to the spindle. The machine is then ready for operation, and the treadle may be depressed thereby applying power to the spindle. As the spindle is rotated, the traverse bar 60 is moved horizontally and while so doing slide bar 240 is also moved and thereby actuates hook 271 and engages the paper measuring mechanism with friction disk 183, thereby pulling measuring rod 171 downwardly until stopped by engagement of the limiting stop pins 196 with 199, or 197 with 200 thereby measuring out the proper length of paper. If a double length of paper is desired, lever 207 may be moved by means of handle 208 thereby withdrawing pin 199 so that rod 171 will be moved until stopped by engagement of pins 197 and 200, the paper being gripped by the two accelerating rolls 172 and 173 and held in readiness for insertion.

During the movement of the traverse bar toward one end of its stroke, the slide bar 240 has also moved lever 334 through the rack 343 and pinion 341 to permit clutch 333 to drive first the feed rolls 169 and 170 and then slide cam plates 167 to disengage feed rolls 169 and 170 and engage accelerating rolls 172 and 173.

Another series of operations have also taken place during the movement of the traverse bar in one direction resulting in movement of slide bar 240, namely: through the action of cam levers 242 and 242a through crank 245 and slide 248, ratchets 256 and 257, pawls 251 and 252, shaft 258 is intermittently rotated, which shaft rotates shaft 222. The amount of this rotation per stroke of bar 240 may be regulated by adjusting the position of block 247 in the arm of crank 245, which in turn rotates shaft 211. This latter shaft raises carriage 150a which supports the paper mechanism and shaft 211 also drives worm wheel 187 which sets the limiting stops controlling the length of stroke of the measuring rod.

The above operations have all been accomplished while the traverse bar has moved from one end of its stroke to the other.

As the traverse bar approaches one end of its stroke, pin 77 will strike nut 75 or 76 thereby moving rod 78. This will actuate lever 298 and cause the knife to be moved downwardly severing the sheet of paper. The movement of rod 78 also throws the low speed clutch throw 12 into engagement through crank lever 128, rod 132, bell crank 133, link 136, cam 143, and lever 149, and the entire mechanism is driven at reduced speed for a short period as link 136 is moved the length of slot 137 after which the machine will again be driven at normal high speed. Upon further movement, rod 78 will actuate the reverse mechanism which will cause one of pins 355a to first be moved out of contact with arm 351, thereby allowing disk 354a to contact with pulley 21 to drive the accelerating rolls, after which further movement will trip catch 347 to allow the feed rolls to become operative by permitting plates 167 to be moved rearwardly, after which the other of pins 355 or 355a will contact with arm 351 to retract disk 354a.

The rotation of the accelerating rolls just described takes place during the interval at which the reversing mechanism is shifting the drive from clutch 55 to 56, or vice versa, and is adjusted to feed the cut sheet of paper on to the coil being wound just before the traverse bar starts on its return stroke.

Movement of the rod 78 and the plate 71 to which it is secured also functions to intermittently operate the pyramiding mechanism. At each complete reciprocation of plate 71, shaft 70 is given a partial turn through the medium of bell crank 97, slide bar 100, lever 102, slide 103, pawls 113 and 113a and ratchets 114 and 115 and spur gears 117 and 118. That is each movement of plate 71 will move pawls 113 and 113a which will intermittently pull ratchets 114 and 115 turning shaft 70 and thereby automatically and intermittently closing nuts 75 and 76 which shortens the stroke of the traverse bar by setting the reversing mechanism into action after a relatively shorter time. If it is not desired to pyramid the coil being wound, the pawls 113 and 113a may be held out of engagement with ratchets. The rate of pyramiding may be regulated by varying the position of block 106 by means of screw shaft 110 without changing gears or dismantling the machine in any degree.

From the foregoing it is apparent that slide bar 240 is utilized to control the operation of the measuring rod, the feed and accelerating rolls, the raising of the carriage and the stroke of the measuring rod, whereas rod 78 controls the operation of the knife, the two speed drive and the reversal of the traverse bar.

If the operator desires to coarsely spiral any given layer upon the coil he has merely to hold lever 47 over to its left position till the layer is wound.

For purposes of clarity of description, many of the details that might have been included in many of the figures of the drawings, have in fact only been shown in two or three of the figures to give a better view of other essential elements.

It is obvious that minor changes may be made in the details of the structure without departing from the spirit and scope of the invention as defined in the following appended claims.

I claim:

1. In a winding machine, a winding spindle, a traverse bar for guiding wire to said spindle, means for imparting movement to said bar, reversing mechanism, a shaft and stops thereon for controlling and for reversing the movement of said bar after predetermined movement in each direction, a crank, a pivoted lever actuated by said crank and connections between said lever and said shaft to intermittently rotate the shaft.

2. In a winding machine, a winding spindle, a traverse bar for guiding wire to said spindle, means for imparting movement to said bar, reversing mechanism, a shaft and stops thereon for controlling and for reversing the movement of said bar after predetermined movement in each direction, a crank actuated by said reversing mechanism, a pivoted lever actuated by said crank and connections between said lever and said shaft to intermittently rotate the shaft.

3. In a winding machine, a winding spindle, a traverse bar for guiding wire to said spindle, means for imparting movement to said bar, reversing mechanism, a shaft and stops associated therewith for controlling the movement of said bar after predetermined movement in each direction, a crank actuated by said reversing mechanism, a pivoted lever actuated by said crank, means for adjusting said pivot, and connections between said lever and said shaft to intermittently rotate the shaft.

4. In a winding machine, a winding spindle, a traverse bar for guiding wire to said spindle, means for imparting movement to said bar, reversing mechanism including a plate, a threaded rod, and stops associated therewith for reversing the movement of said bar, a crank actuated by said reversing mechanism, a lever actuated by said crank and ratchet and pawl connections between said lever and said rod adapted to rotate said rod upon movement in one direction of said plate.

5. In a winding machine, a winding spindle, means for rotating the spindle at a predetermined speed, a traverse bar, means for imparting motion to said traverse bar to cause said bar to lay successive layers of wire upon said spindle, and means for temporarily varying the movement of the traverse bar relatively to the rotation of said spindle during normal operation of the machine to cause certain of said layers to be coarsely wound relatively to the other layers.

6. In a winding machine, a winding spindle, means for rotating said spindle at a predetermined speed, a traverse bar, means for imparting motion to said bar to cause said bar to lay successive layers of wire upon said spindle and a second drive for temporarily rotating said spindle at a different speed relatively to the movement of said bar and during movement of said bar to cause certain of said layers to be coarsely wound relatively to the other layers.

7. In a winding machine, a winding spindle, means for rotating said spindle at a predetermined speed, a traverse bar, means for imparting motion to said bar to cause said bar to lay successive layers of wire upon said spindle, and a second drive for temporarily rotating said spindle at a different speed relatively to the movement of said bar and during movement of said bar, and a clutch for selectively engaging either spindle drive to cause certain of said layers to be coarsely wound relatively to the other layers.

8. In a winding machine, a winding spindle, a traverse bar, means for imparting motion to said bar to cause said bar to lay successive layers of wire upon said spindle, a positive drive for rotating said spindle at a predetermined speed relatively to the movement of said bar and a second positive drive selective to rotate said spindle at a reduced speed relatively to said bar and during movement of said bar to cause certain of said layers to be coarsely wound relatively to the other layers.

9. In a winding machine, a winding spindle, a spindle shaft for rotating said spindle, a traverse bar, a cross shaft for imparting motion to said traverse bar to cause said bar to lay successive layers of wire on said spindle, a driving shaft connected to said cross shaft and adapted to be coupled to said spindle shaft and means connected to said cross shaft adapted to be connected to said spindle shaft to rotate the same.

10. In a winding machine, a winding spindle, a main driving shaft, a traverse bar, a cross shaft for imparting motion to said traverse bar, a train of gears connecting said main shaft and said cross shaft, a spindle shaft for rotating said spindle, an auxiliary shaft driven by said cross shaft and a double clutch connecting said spindle shaft to either said cross shaft or said main shaft.

11. In a coil winding machine, a tubular drive shaft, a winding spindle, a spindle shaft within said tubular shaft, a traverse bar, a cross shaft driven by said drive for imparting motion to said traverse bar, and a clutch operable to connect said spindle shaft to be driven either by said tubular shaft or said cross shaft.

12. In a winding machine, a winding spindle, a traverse member for feeding wire to said spindle, means for driving said spindle and member, and a second drive automatically operative to positively drive said spindle and said member at a relatively reduced speed at predetermined intervals in the winding operation.

13. In a winding machine, a winding spindle, a traverse member for feeding a wire to said spindle and driving means for rotating said spindle and actuating said member, means for reversing the direction of feed of said traverse member and means for automatically periodically driving said spindle and said member at a relatively reduced speed.

14. In a winding machine, a winding spindle, a traverse member for feeding a wire to the spindle and driving means for rotating said spindle and actuating said member, means for reversing the direction of feed of said traverse member and means controlled by said reversing means for automatically periodically varying the speed of said driving means.

15. In a winding machine, a winding spindle, a traverse member for feeding a wire to the spindle, and driving means for rotating said spindle and actuating said member, for reversing the direction of feed of said traverse member and means controlled by said reversing means for automatically periodically varying the speed of said driving means including an intermittently operable cam and a clutch controlled by said cam.

16. In a winding machine, a winding spindle, a traverse member for feeding a wire to the spindle and driving means for rotating said spindle and actuating said member, means for reversing the direction of feed of said traverse member and means controlled by said reversing means for automatically periodically varying the speed of said driving means including interconnected levers and cranks controlled by said reversing means, a locking pawl, an intermittently operable cam, controlled by said pawl, and a clutch controlled by said cam.

17. In a winding machine, a winding spindle, a traverse member for feeding a wire to the spindle and driving means for rotating said spindle and actuating said member, means for reversing the direction of feed of said traverse member and means controlled by said reversing means for automatically periodically varying the speed of said driving means including interconnected levers and cranks controlled by said reversing means, a locking pawl, an intermittently operable friction driven cam, controlled by said pawl, and a clutch controlled by said cam.

18. In a winding machine, a winding spindle, a traverse member for feeding a wire to the spindle and driving means for rotating said spindle and actuating said member, means for reversing the direction of feed of said traverse member and means controlled by said reversing means for automatically periodically varying the speed of said driving means including a rod actuated by said reversing means, a cam link operable by said rod, a pawl controlled by said link and an intermittently operable cam adapted to vary the driving means.

19. In a winding machine, a winding spindle, a traverse member for feeding a wire to the spindle and driving means for rotating said spindle and actuating said member, means for reversing the direction of feed of said traverse member and means for automatically periodically varying the speed of said driving means, comprising a cam adapted to be driven by said driving means, a lever associated with said cam and with said driving means, a pawl for controlling rotation of said cam, and means controlling said pawl to periodically permit rotation of said cam.

20. In a winding machine, a winding spindle, a traverse member for feeding a wire to the spindle and driving means for rotating said spindle and actuating said member, means for reversing the direction of feed of said traverse member and means for automatically periodically varying the speed of said driving means, comprising a cam adapted to be driven by said driving means, a lever associated with said cam and with said driving means, a pawl for controlling rotation of said cam, and means controlling said pawl to periodically permit rotation of said cam, said latter means being controlled by said reversing means.

21. In a winding machine, a winding spindle, a traverse member for feeding a wire to the spindle and driving means for rotating said spindle and actuating said member, means for reversing the direction of feed of said traverse bar and means for automatically periodically varying the speed of said driving means, comprising a cam adapted to be driven by said driving means, a lever associated with said cam and with said driving means, a pawl for controlling rotation of said cam, and means controlling said pawl to periodically permit rotation of said cam, said latter means being adjustably controlled by said reversing means.

22. In a winding machine, a winding spindle, a traverse member, means for actuating said member to cause it to lay successive layers of wire on said spindle, means for delivering paper to said spindle in definite relation to movements of said traverse member, paper measuring mechanism including a pivoted measuring rod and adjustable limiting stops for controlling the amplitude of stroke of said rod, and means for intermittently advancing the position of said stops to permit said rod to take successively longer measuring strokes.

23. In a winding machine, a winding spindle, a traverse member, means for actuating said member, means for delivering paper to said spindle in definite relation to movements of said traverse member, paper measuring mechanism including a pivoted measuring rod and a plurality of adjustable limiting stops for controlling the measuring stroke of said rod, and means for automatically advancing said plurality of stops in a predetermined relation relatively to each other to permit said rod to take successively longer measuring strokes.

24. In a winding machine, a winding spindle, a traverse member, means for actuating said member, means for delivering paper to said spindle in definite relation to movements of said traverse member, paper measuring mechanism including a plurality of limiting stops for controlling said mechanism, and means for automatically advancing said stops in a predetermined relation relatively to each other while maintaining a predetermined relation between said stops.

25. In a winding machine, a winding spindle, a traverse member, means for actuating said member, means for delivering paper to said spindle in definite relation to movements of said traverse member, paper measuring mechanism including a plurality of limiting stops for controlling said mechanism, means for automatically advancing said stops in a predetermined relation relatively to each other, and means for selectively engaging any one of said plurality of stops.

26. In a winding machine, a winding spindle, a traverse member, means for actuating said member, means for delivering paper to said spindle in definite relation to movements of said traverse member, paper measuring mechanism including a plurality of limiting stops for controlling said mechanism, and means for automatically advancing said stops in a predetermined relation relatively to each other, a removable pin adapted to selectively engage one of said plurality of stops.

27. In a winding machine, a winding spindle, a traverse member, means for actuating said member, means for delivering paper to said spindle in definite relation to movements of said traverse member, paper measuring mechanism including a plurality of limiting stops for controlling said mechanism, means for automatically advancing said stops in a predetermined relation relatively to each other, a removable pin adapted to selectively engage one of said plurality of stops, and means for withdrawing said pin at will.

28. In a winding machine, a winding spindle, a traverse member, means for actuating said member, means for delivering paper to said spindle in definite relation to movements of said traverse member, paper measuring mechanism including a plurality of segmental gears, means for driving said gears in a predetermined relation relatively to each other, limiting stops carried by said gears for limiting the movement of said mechanism.

29. In a winding machine, a winding spindle, a traverse member, means for actuating said member, means for delivering paper to said spindle in definite relation to movements of said traverse member, paper measuring mechanism including a plurality of intermittently driven segmental gears, means for driving said gears in a predetermined relation relatively to each other, limiting stops carried by said gears for limiting the movement of said mechanism.

30. In a winding machine, a winding spindle, a traverse member, means for actuating said member, means for delivering paper to said spindle in definite relation to movements of said traverse member, paper measuring mechanism including a plurality of intermittently driven segmental gears, means for driving said gears in a predetermined relation relatively to each other, limiting stops carried by said gears for limiting the movement of said mechanism, and a retractable pin adapted to selectively engage one of said limiting stops.

31. In a winding machine, a winding spindle, a traverse member, means for actuating said member, means for delivering paper to said spindle in definite relation to movements of said traverse member, paper measuring mechanism including a plurality of intermittently driven segmental gears, means for driving said gears in a predetermined relation relatively to each other, limiting stops carried by said gears for limiting the movement of said mechanism, a retractable pin adapted to selectively engage one of said limiting stops, and a lever and fork operable to withdraw said removable pin.

32. In a winding machine, a winding spindle, a traverse member, means for actuating said member, means for delivering paper to said spindle in definite relation to movements of said traverse member, paper measuring mechanism and means operable by said actuating means for controlling said measuring mechanism.

33. In a winding machine, a winding spindle, a traverse member, a shaft for actuating said member, means for delivering paper to said spindle in definite relation to movements of said traverse member, paper measuring mechanism including a plurality of limiting stops, means for advancing said stops in a predetermined relation relatively to each other, limiting stops carried by said gears for limiting the movement of said paper measuring mechanism, a slide bar reciprocated by said shaft, and means operable from said bar for controlling said measuring mechanism.

34. In a winding machine, a winding spindle, a traverse member, a shaft for actuating said member, means including a carriage for delivering paper to said spindle in definite relation to movements of said traverse member, paper measuring mechanism including a plurality of segmental gears, means for driving said gears in a predetermined relation relatively to each other, and limiting stops carried by said gears for limiting the movement of said paper measuring mechanism, a slide bar reciprocated by said shaft, means operable from said bar for controlling said measuring mechanism, and means operable from said bar for raising said carriage as the winding on said spindle progresses.

35. In a winding machine, a winding spindle, a traverse member, a shaft for actuating said member, means for delivering paper to said spindle in accordance with movements of said member, paper measuring mechanism, a slide bar reciprocated by said shaft, limiting stops for controlling said measuring mechanism positioned by means actuated by said slide bar.

36. In a winding machine, a winding spindle, a traverse member, a shaft for actuating said member, means including a pivoted carriage for delivering paper to said spindle in accordance with movements of said member, paper measuring mechanism, independently adjustable limiting stops for controlling said measuring mechanism, a slide bar reciprocated by said shaft, and means operable from said slide bar for raising said carriage and for independently advancing said stops.

37. In a winding machine, a winding spindle, a traverse member, a shaft for actuating said member, a slide bar reciprocated by said shaft, means including a pivoted carriage for delivering paper to said spindle in accordance with movements of said member, paper measuring mechanism, independently adjustable limiting stops for controlling said measuring mechanism, means for raising said carriage, and a common means for energizing said mechanism for independently controlling said stops and for raising said carriage.

38. In a winding machine, a winding spindle, a traverse member, a shaft for actuating said member, a slide bar reciprocated by said shaft, means including a pivoted carriage for delivering paper to said spindle in accordance with movements of said member, means for raising said carriage, paper measuring mechanism, independently adjustable limiting stops for controlling said measuring mechanism, and a common means for actuating said raising means and said mechanism for independently controlling said stops.

39. In a winding machine, a winding spindle, a traverse member, a shaft for actuating said member, a slide bar reciprocated by said shaft, means including a pivoted carriage for delivering paper to said spindle in accordance with movements of said member, means for raising said carriage, paper measuring mechanism including independently adjustable limiting stops for controlling said measuring mechanism, and a common means for independently controlling said stops and for raising said carriage.

40. In a winding machine, a winding spindle, a traverse member, a shaft for actuating said member, a slide bar reciprocated by said shaft, means including a pivoted carriage for delivering paper to said spindle in accordance with movements of said member, means for raising said carriage, paper measuring mechanism, including independently adjustable limiting stops for controlling said measuring mechanism, and a common means controlled from said slide bar for energizing said mechanism and for raising said carriage.

41. In a winding machine, a winding spindle, a traverse member, a shaft for imparting motion to said member, reversing mechanism for reversing the direction of rotation of said shaft, means for feeding a sheet of paper to said spindle, a knife operable to cut said sheet into predetermined lengths, means for moving said knife into contact with said sheet of paper, a rod reciprocated in accordance with movements of said traverse member, means actuated by said rod for reversing the rotation of said shaft, and means associated with said rod for controlling the movement of said knife.

42. In a winding machine, a winding spindle, a traverse member for guiding wire to said spindle, means for driving said spindle, means for imparting motion to said member to cause it to lay successive layers of wire upon said spindle, mechanism for reversing the movement of said traverse member, means for altering the speed of driving said spindle relatively to said traverse bar, means for feeding a sheet of paper to said spindle, a knife operable to sever said paper and a common actuating means for controlling the reversing mechanism, the variable speed means and said knife.

43. In a winding machine, a winding spindle, a traverse member for guiding wire to said spindle, means for imparting movement to said member to cause it to lay successive layers of wire upon said spindle, a rod operable in response to movements of said traverse member, contact members secured to said rod, means for feeding paper to said spindle, a knife for cutting said paper, and means operable by said contact members for permitting operation of said knife.

44. In a winding machine, a winding spindle, a traverse member for guiding wire to said spindle, means for imparting movement to said member to cause it to lay successive layers of wire upon said spindle, a rod operable in response to movements of said traverse member, contact members secured to said rod, means for feeding paper to said spindle, a knife for cutting said paper, means for normally actuating said knife, means for withholding said knife, a lever for releasing said latter means controlled by said contact members.

45. In a winding machine, a winding spindle, a traverse member for guiding wire to said spindle, means for imparting movement to said member to cause it to lay successive layers of wire upon said spindle, a rod operable in response to movements of said traverse member, contact members secured to said rod, means for feeding paper to said spindle, a knife for cutting said paper actuated by a normally operative clutch, a lever controlling said clutch, a rock shaft, abutments carried by said shaft adapted to contact with said contact members to control the operation of said knife.

46. In a winding machine, a winding spindle, a traverse member for guiding wire to said spindle, means for imparting motion to said member to cause it to lay successive layers of wire upon said spindle, means for feeding paper to said spindle comprising a pair of feed rolls and a pair of accelerating rolls, means for alternately opening and closing said pairs of rolls to make them alternately operative to feed said paper to said spindle.

47. In a winding machine, a winding spindle, a traverse member for guiding wire to said spindle, means for imparting motion to said member to cause it to lay successive layers of wire upon said spindle, means for feeding paper to said spindle comprising a pair of feed rolls and a pair of accelerating rolls, a pair of movable plates forming bearings for one of each pair of rolls, means for moving said plates to alternately open and close the two pairs of rolls.

48. In a winding machine, a winding spindle, a traverse member for guiding wire to said spindle, means for imparting motion to said member to cause it to lay successive layers of wire upon said spindle, means for feeding paper to said spindle comprising a pair of feed rolls and a pair of accelerating rolls, a pair of movable plates forming bearings for one of each pair of rolls, a common means for rotating said feed rolls and for moving said plates to alternately open and close the two pairs of rolls.

49. In a winding machine, a winding spindle, a transverse member for guiding wire to said spindle, means for imparting motion to said member to cause it to lay successive layers of wire upon said spindle, means for feeding paper to said spindle comprising a pair of feed rolls and a pair of accelerating rolls, a pair of movable plates forming bearings for one of each pair of rolls, means for normally urging said plates in one direction, means for moving said plates against said normally acting means, a latch for holding said plates in one position and a common means for rotating said feed rolls and for actuating said plate moving means.

50. In a winding machine, a winding spindle, a traverse member for guiding wire to said spindle, means for feeding paper to said spindle comprising a pair of feed rolls, a pair of accelerating rolls, a pair of movable cam plates for supporting certain of said rolls, means for normally urging said plates in one direction, means for moving said plates out of said normal position, a catch for holding said plates in said latter position, means for rotating said feed rolls, means for rotating said accelerating rolls, and a trip associated with said latter means for releasing said catch.

51. In a winding machine, a winding spindle, a traverse member for guiding wire to said spindle, means for imparting movement to said member for causing it to lay successive layers of wire upon said spindle, means for feeding paper to said spindle including a pair of feed rolls supported by a pair of slidable plates, means for rotating said rolls, means for sliding said plates to cause said rolls to be operative upon said paper and a common means for controlling said rotation and said sliding movement.

52. In a winding machine, a winding spindle, a traverse member for guiding wire to said spindle, means for imparting movement to said member for causing it to lay successive layers of wire upon said spindle, a bar operable from said means, means for feeding paper to said spindle including a pair of feed rolls supported by a pair of slidable plates, means for rotating said rolls, means for sliding said plates to cause said rolls to be operative upon said paper and a common means actuated by said bar for controlling said rotation and said sliding movement.

53. In a winding machine, a winding spindle, a traverse member for guiding wire to said spindle, means for imparting movement to said member for causing it to lay successive layers of wire upon said spindle, a bar operable from said means, means for feeding paper to said spindle including a pair of feed rolls, supported by a pair of slidable plates, a common means for rotating said rolls and sliding said plates to cause said rolls to be operative upon said paper controlled by mechanism associated with said bar.

54. In a winding machine, a winding spindle, a traverse member for guiding wire to said spindle, means for imparting motion to said member to cause it to lay successive layers of wire upon said spindle, a bar operable from said latter means, means for delivering paper to said spindle including a pivoted carriage, means for raising said carriage, means for measuring predetermined lengths of sheets of paper, a knife for severing said measured sheets, feed rolls mounted in a pair of slidable plates for feeding said paper, means for rotating said rolls and sliding said plates to cause said rolls to be operative upon said paper, and a common control means for controlling the movements of said carriage, said measuring means, said feed rolls and said plates all in accordance with relation to movements of said traverse member.

55. In a winding machine, a winding spindle, a traverse member for guiding wire to said spindle, means for imparting motion to said member to cause it to lay successive layers of wire upon said spindle, a bar operable from said latter means, means for delivering paper to said spindle including a pivoted carriage, means for raising said carriage, means for measuring sheets of paper of predetermined lengths, a knife for severing said measured sheets, feed rolls mounted in a pair of slidable plates for feeding said paper, means for rotating said rolls and sliding said plates to cause said rolls to be operative upon said paper and a common control means actuated by said bar for controlling the movements of said carriage, said measuring means, said feed rolls and said plates.

56. In a winding machine, a winding spindle, means for rotating said spindle, a traverse member for guiding wire to said spindle, means for imparting motion to said traverse member to cause it to lay successive layers of wire on said spindle, means for periodically affecting said latter movement to cause said member to lay successively shorter layers, and means for temporarily varying the movement of said traverse member relatively to the rotation of said spindle without interrupting the operation of the machine to cause certain of the layers to be coarsely wound relatively to the other layers.

57. In a winding machine, a winding spindle, means for rotating said spindle, a traverse member for guiding wire to said spindle, means for imparting motion to said traverse member to cause it to lay successive layers of wire on said spindle, means for periodically affecting said latter movement to cause said member to lay successively shorter layers, and a second drive for temporarily rotating said spindle at a different speed relatively to movement of said traverse member to cause certain of the layers to be coarsely wound relatively to the other layers.

58. In a winding machine, a winding spindle, means for rotating said spindle, a traverse member for guiding wire to said spindle, means for imparting motion to said traverse member to cause it to lay successive layers of wire on said spindle, means for periodically affecting said latter movement to cause said member to lay successively shorter layers, and a second drive for temporarily rotating said spindle at a different speed relatively to movement of said traverse member to cause certain of the layers to be coarsely wound relatively to the other layers, and a clutch for selectively engaging either drive.

59. In a winding machine, a winding spindle, a positive drive for rotating said spindle, a traverse member for guiding wire to said spindle, means for imparting motion to said member to cause it to lay successive layers of wire upon said spindle, means for periodically affecting said latter movement to cause said member to lay successively shorter layers upon said spindle, and a second drive selective to rotate said spindle at a reduced speed relatively to movements of said traverse member to cause certain of said layers to be coarsely wound relatively to the other layers.

60. In a winding machine, a winding spindle, means for driving said spindle, a traverse member for guiding wire to said spindle, means for imparting motion to said member to cause it to lay successive layers of wire upon said spindle, means for automatically and periodically varying said two means at predetermined intervals in the winding operation and means for periodically affecting the movement of said traverse bar to cause it to lay successively shorter layers, said latter means being adjustable to vary the degree of shortening of said layers.

61. In a winding machine, a winding spindle, means for driving said spindle, a traverse member for guiding wire to said spindle, means for imparting motion to said member to cause it to lay successive layers of wire upon said spindle, means controlled by said member for automatically and periodically positively driving said spindle and said member at a definite reduced speed at predetermined intervals in the winding operation and means for periodically affecting the movement of said traverse bar to cause it to lay successively shorter layers.

62. In a winding machine, a winding spindle, means for driving said spindle, a traverse member for guiding wire to said spindle, means for imparting motion to said member to cause it to lay successive layers of wire upon said spindle, reversing mechanism for reversing said means, means actuated by said reversing means for automatically and periodically positively driving said spindle and said member at a definite reduced speed at predetermined intervals in the winding operation and means controlled by said reversing means for periodically affecting the movement of said traverse bar to cause it to lay successively shorter lengths.

63. In a winding machine, a winding spindle, a traverse member, means for imparting motion to said member to cause it to lay successive layers of wire upon said spindle, means automatically and intermittently operable to cause said member to lay successively shorter layers, means for delivering paper to said spindle in definite relation to movements of said member, paper measuring mechanism including a pivoted measuring rod, and adjustable limiting stops for controlling the measuring stroke of said rod and means for intermittently advancing said stops to permit said rod to take successively longer strokes.

64. In a winding machine, a winding spindle, a traverse member, means for imparting motion to said member to cause it to lay successive layers of wire upon said spindle, means controlled by movement of said member automatically and intermittently operable to cause said member to lay successively shorter layers, means for delivering paper to said spindle in definite relation to movements of said member, paper measuring mechanism including a pivoted measuring rod, and adjustable limiting stops for controlling the measuring stroke of said rod and means for intermittently advancing said stops to permit said rod to take successively longer strokes.

65. In a winding machine, a winding spindle, a traverse member, means for imparting motion to said member to cause it to lay successive layers of wire upon said spindle, means controlled by movement of said member automatically and intermittently operable to cause said member to lay successively shorter layers, means for delivering paper to said spindle in definite relation to movement of said member, paper measuring mechanism including limiting stops for controlling the measuring stroke of said mechanism and means for intermittently advancing said stops, while maintaining a predetermined relation between said stops.

66. In a winding machine, a winding spindle, a traverse member, means for imparting motion to said member to cause it to lay successive layers of wire upon said spindle, means automatically and intermittently operable to cause said member to lay successively shorter layers, means for delivering paper to said spindle in definite relation to movements of said member, paper measuring mechanism including a plurality of limiting stops for controlling the measuring stroke of said mechanism and means for intermittently advancing said stops while maintaining a predetermined relation between said stops.

67. In a winding machine, a winding spindle, means for rotating said spindle, a traverse member for guiding wire to said spindle, means for imparting motion to said traverse member to cause it to lay successive layers of wire on said spindle, means controlled by the movement of said traverse member for affecting said latter movement to cause said member to lay successively shorter layers and means for temporarily varying the movement of said traverse member relatively to the rotation of said spindle without interrupting the normal operation of the machine to cause certain of said layers to be coarsely wound relatively to the other layers.

68. In a winding machine, a winding spindle, a traverse member, means for rotating said spindle, means for actuating said member to cause it to lay successive layers of wire upon said spindle, means for delivering paper to said spindle at definite periods in accordance with certain positions of said traverse member, paper measuring mechanism including adjustable limiting stops for controlling the length of paper measured, means for advancing said stops, and means for automatically positively driving said spindle at a reduced speed of rotation while paper is being fed to said spindle.

69. In a winding machine, a winding spindle, a traverse member, means for rotating said spindle, means for actuating said member to cause it to lay successive layers of wire upon said spindle, means for delivering paper to said spindle at definite periods in accordance with certain positions of said traverse member, paper measuring mechanism including a plurality of adjustable limiting stops for controlling the length of paper measured, means for advancing said stops while maintaining a predetermined relation between said stops and means for automatically varying the speed of rotation of said spindle while paper is being fed to said spindle.

70. In a winding machine, a winding spindle, a traverse member, means for rotating said spindle, means for actuating said member to cause it to lay successive layers of wire upon said spindle, reversing mechanism for reversing said latter means, means for delivering paper to said spindle at definite periods in accordance with certain positions of said traverse member, paper measuring mechanism including adjustable limiting stops for controlling the length of paper measured, means for advancing said stops and means controlled by said reversing mechanism for automatically positively driving said spindle at a reduced speed while paper is being fed to said spindle.

71. In a winding machine, a winding spindle, a traverse member, means for rotating said spindle, means for actuating said member to cause it to lay successive layers of wire upon said spindle, reversing mechanism for reversing said latter means, means for delivering paper to said spindle at definite periods in accordance with certain positions of said traverse member, paper measuring mechanism including a plurality of adjustable limiting stops for controlling the length of paper measured, means for advancing said stops while maintaining a predetermined relation between said stops and means controlled by said reversing mechanism for automatically positively driving said spindle at a reduced speed while paper is being fed to said spindle.

72. In a winding machine, a winding spindle, means for rotating said spindle, a traverse member, means for actuating said member to cause it to lay successive layers of wire upon said spindle, means for varying the rotation of said spindle relatively to movements of said traverse member during the normal operation of said machine to cause certain of said layers to be more coarsely wound than others and means for automatically varying the speed of driving said spindle and said traverse member in accordance with movements of said traverse member.

73. In a winding machine, a winding spindle, means for rotating said spindle, a traverse member, means for actuating said member to cause it to lay successive layers of wire upon said spindle, means for varying the rotation of said spindle relatively to movements of said traverse member during the normal operation of said machine to cause certain of said layers to be more coarsely wound than others and means for automatically driving said spindle and said traverse member at a definite reduced speed at predetermined intervals.

74. In a winding machine, a winding spindle, means for rotating said spindle, a traverse member, means for actuating said member to cause it to lay successive layers of wire upon said spindle, reversing mechanism for reversing the movement of said member, means for varying the rotation of said spindle relatively to movements of said traverse member during normal operation of said machine to cause certain of said layers to be more coarsely wound than others and means controlled by said reversing mechanism for automatically driving said spindle and said traverse member at a definite reduced speed at predetermined intervals.

75. In a winding machine, a winding spindle, means for rotating said spindle, a traverse member, means for actuating said traverse member to cause it to lay successive layers of wire on said spindle, means for varying the rotation of said spindle relatively to movements of said traverse member during normal operation of said machine to cause certain of said layers to be coarsely wound, paper delivering mechanism for delivering paper to said spindle including paper measuring means, adjustable limiting stops for controlling said measuring means and means for automatically and intermittently advancing said stops.

76. In a winding machine, a winding spindle, means for rotating said spindle, a traverse member, means for actuating said traverse member to cause it to lay successive layers of wire on said spindle, means for varying the rotation of said spindle relatively to movements of said traverse member during normal operation of said machine to cause certain of said layers to be coarsely wound, paper delivering mechanism for delivering paper to said spindle including paper measuring means, a plurality of adjustable limiting stops for controlling said measuring means and means for automatically and intermittently advancing said stops while maintaining a predetermined relation between said stops.

77. In a winding machine, a winding spindle, means for rotating said spindle, a traverse member, means for actuating said traverse member to cause it to lay successive layers of wire on said spindle, a bar actuated by said latter means in accordance with movements of said traverse member, means for varying the rotation of said spindle relatively to movements of said traverse member during normal operation of said machine to cause certain of said layers to be coarsely wound, paper delivering mechanism for delivering paper to said spindle including paper measuring means, adjustable limiting stops for controlling said measuring means and means controlled by said bar for automatically and intermittently advancing said stops.

78. In a winding machine, a winding spindle, a traverse bar, a shaft for actuating said traverse bar, a slide bar also operable by said means, an adjustable carriage, automatic means for raising said carriage, paper delivery means, including measuring mechanism, adjustable stops, and feed rolls for feeding paper to said spindle all mounted upon said carriage, control means actuated by said slide bar for controlling movements of said carriage, of said measuring rod, said adjustable stops and said feed rolls.

79. A coil winding machine comprising a rotary spindle; a guiding traverse for the wire to wind the same in layers; a shaft for rotating said spindle; means operated from said shaft for operating said traverse at one speed relative thereto; means for operating said shaft at a reduced speed; and means to drive said guiding traverse from said shaft at another relative speed with respect thereto whereby the distance between the turns of wire wound is varied.

80. A wire winding machine, comprising a rotary spindle; a wire guiding traverse therefor; a shaft for rotating said spindle; means operated from said shaft for driving said wire traverse at one speed relative to said shaft; means operating said shaft at a reduced speed; and means to drive said guiding traverse at another speed relative to said shaft.

81. In a coil winding machine, a combination of wire winding mechanism comprising a rotary spindle and a guiding traverse for the wire to form layers normally operating at certain speeds, mechanism for applying insulating material between layers of wire, means operating the spindle at a reduced speed and operating said guiding traverse at normal speed to vary the distance between the turns of wire wound, and means to operate said insulation applying mechanism at substantially the same speed during both driving speeds of the spindle.

82. In a winding mechanism, a winding spindle, a traverse bar for guiding wire to said spindle, reversing mechanism for reversing the movement of said bar, a longitudinally movable rotatable rod for actuating said reversing mechanism, stops on said rod adapted to be engaged by said bar to shift said rod longitudinally to actuate said reversing mechanism, and means actuated by said longitudinal movement to rotate said rod and shift said stops to produce successively shorter movements of said bar.

NIELS PEDERSEN.